United States Patent
Sun et al.

(10) Patent No.: US 11,849,313 B2
(45) Date of Patent: Dec. 19, 2023

(54) METHOD AND APPARATUS FOR ASSIGNING EBI

(71) Applicant: Huawei Technologies Co., Ltd., Shenzhen (CN)

(72) Inventors: Haiyang Sun, Baijing (CN); Anni Wei, Shenzhen (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

(21) Appl. No.: 17/174,581

(22) Filed: Feb. 12, 2021

(65) Prior Publication Data

US 2021/0168595 A1 Jun. 3, 2021

Related U.S. Application Data

(63) Continuation of application No. PCT/CN2019/100460, filed on Aug. 13, 2019.

(30) Foreign Application Priority Data

Aug. 13, 2018 (CN) .......................... 201810918782.5

(51) Int. Cl.
   *H04W 12/106* (2021.01)
   *H04W 12/033* (2021.01)
   *H04W 28/24* (2009.01)

(52) U.S. Cl.
   CPC ....... *H04W 12/033* (2021.01); *H04W 12/106* (2021.01); *H04W 28/24* (2013.01)

(58) Field of Classification Search
   CPC . H04W 12/033; H04W 12/106; H04W 12/37; H04W 12/02; H04W 12/10;
   (Continued)

(56) References Cited

U.S. PATENT DOCUMENTS

2018/0121514 A1 5/2018 Reisz et al.

FOREIGN PATENT DOCUMENTS

| CN | 108124238 A | 6/2018 |
| EP | 3319392 A1 | 5/2018 |

(Continued)

OTHER PUBLICATIONS

3GPP TS 23.502 V15.2.0, "3rd Generation Partnership Project; Technical Specification Group Services and System Aspects; Procedures for the 5G System; Stage 2 (Release 15)," Jun. 2018, 308 pages.

(Continued)

*Primary Examiner* — Brian F Shaw
(74) *Attorney, Agent, or Firm* — Conley Rose, P.C.

(57) ABSTRACT

When an EBI needs to be assigned to an EPS bearer to which a QoS flow is mapped in an EPS, whether user plane security enforcement information of a PDU session matches user plane encryption protection information of the EPS is determined, that is, whether a user plane capability of the EPS can meet a user plane security requirement of the PDU session is determined. The EBI is assigned to the EPS bearer only when the requirement is met. Otherwise, the EBI is not assigned to the EPS bearer or the EBI is released if the EBI has been assigned. In this way, when UE moves from a 5GS to the EPS, the EPS bearer is prevented from using an EBI that does not meet the user plane security requirement for data transmission.

20 Claims, 10 Drawing Sheets

(58) Field of Classification Search
CPC ..... H04W 28/24; H04W 76/12; H04W 76/32; H04W 76/10
See application file for complete search history.

(56) References Cited

FOREIGN PATENT DOCUMENTS

| WO | 2012050841 A1 | 4/2012 |
| WO | 2017111781 A1 | 6/2017 |
| WO | 2018026169 A1 | 2/2018 |

OTHER PUBLICATIONS

3GPP TS 33.401 V15.4.0, "3rd Generation Partnership Project; Technical Specification Group Services and System Aspects; 3GPP System Architecture Evolution (SAE); Security architecture (Release 15)," Jun. 2018, 162 pages.
Ericsson, "Allocation of EPS bearer ID in 5GS," SA WG2 Meeting #121, S2-173322, May 15-19, 2017, Hangzhou, China, 8 pages.
Catt, et al., "Discussion on EPS bearer ID allocation," SA WG2 Meeting #122bis, Au~ France, S2-175877, 3 pages.
ZTE, "23.502 P-CR Discussion and proposal on EBI management, exhaustion and relocation," SA WG2 Meeting #123, Oct. 23-27, 2017, Ljubljana, Slovenia, S2-177112, 9 pages.
NTT DOCOMO, EPS bearer ID allocation update. 3GPP TSG-SA WG2 Meeting #125, Gothenburg, Sweden; Jan. 22-26, 2018, S2-180708, 9 pages.

METHOD AND APPARATUS FOR ASSIGNING EBI

CROSS-REFERENCE TO RELATED APPLICATIONS

This application is a continuation of International Patent Application No. PCT/CN2019/100460, filed on Aug. 13, 2019, which claims priority to Chinese Patent Application No. 201810918782.5, filed on Aug. 13, 2018. The disclosures of the aforementioned applications are hereby incorporated by reference in their entireties.

TECHNICAL FIELD

The present disclosure relates to the communications field, and in particular, to a method and an apparatus for assigning an evolved packet system (EPS) bearer identity (EBI).

BACKGROUND

In a 5th generation (5G) mobile communications system (5GS), to ensure end-to-end quality of service, a 5G mobile communications technology quality of service (QoS) model based on a QoS flow shown in FIG. 1A is provided. The 5G QoS model supports a guaranteed bit rate (GBR) QoS flow and a non-guaranteed bit rate (non-GBR) QoS flow. Data flows controlled by a same QoS flow have a same QoS guarantee. For a user equipment (UE), the UE may establish one or more protocol data unit (PDU) sessions with the 5GS, where each PDU session may establish one or more QoS flows, where each QoS flow is identified by one QoS flow identifier (QFI), and where the QFI uniquely identifies the QoS flow in the PDU session.

In a network architecture that supports interworking between the 5GS and an EPS, a PDU session in the 5GS may be migrated to the EPS, and a packet data network (PDN) connection corresponding to the PDU session is established in the EPS. Correspondingly, a QoS flow in the PDU session is mapped to an EPS bearer in the PDN connection. In a PDU session establishment procedure that supports interworking in the 5GS, a core network network element in the 5GS needs to assign an EBI to the EPS bearer to which the QoS flow is mapped in the EPS. However, how to assign the EBI to the EPS bearer is currently under discussion.

SUMMARY

A technical problem to be resolved in embodiments of the present disclosure is to provide a method and an apparatus for assigning an EBI, to assign an EBI that meets a requirement to an EPS, and avoid assigning an EBI that does not meet a user plane security requirement to an EPS bearer, thereby reducing signaling overheads and avoiding a waste of EBI resources.

According to a first aspect, this application provides a method for assigning an EBI, including: When user plane security enforcement information of a PDU session matches user plane encryption protection information of an EPS, a transmission management apparatus sends EBI assignment request information to an access management apparatus, where the EBI assignment request information is used to request to assign an EBI to an EPS bearer to which a QoS flow is mapped in the EPS, and where the PDU session includes at least one QoS flow.

In this embodiment of the present disclosure, the transmission management apparatus sends the EBI assignment request information to the access management apparatus only when the user plane security enforcement information of the PDU session matches the user plane encryption protection information of the EPS. In this way, only when user plane security of the EPS meets a security requirement of the PDU session, the EBI is requested to be assigned, to avoid assigning an EBI that does not meet the user plane security requirement to the EPS bearer.

When the EBI needs to be assigned to the EPS bearer to which the QoS flow is mapped in the EPS, a session management function (SMF)+PDN gateway (PGW) control plane (SMF+PGW-C) obtains the user plane security enforcement information associated with the PDU session and the user plane encryption protection information of the EPS, where the QoS flow is located in the PDU session. When the user plane security enforcement information matches the user plane encryption protection information, the transmission management apparatus sends an EBI assignment request to the access management apparatus, where the EBI assignment request carries a PDU session identifier, and where the PDU session identifier is an identity of the PDU session.

In any one of the following cases, it indicates that the EBI needs to be assigned to the ESP bearer to which the QoS flow is mapped in the EPS. When a UE initiates a PDU session establishment request in a non-roaming or roaming with local breakout case, the PDU session supports interworking between a 5GS and the EPS; or the UE initiates PDU session modification in a non-roaming or roaming with local breakout case, and the PDU session supports interworking between the 5GS and the EPS; or the UE or a network device initiates PDU session modification in a home-routed roaming case, and the PDU session supports interworking between the 5GS and the EPS; or the UE or a network requests a PDU session modification procedure.

In a possible design, the user plane security enforcement information of the PDU session includes integrity protection requirement information and encryption requirement information, and the user plane encryption protection information of the EPS includes user plane encryption activation information, where the integrity protection information indicates that the PDU session is not integrity protected, the encryption requirement information indicates that the PDU session is not encrypted, and the user plane security enforcement information of the PDU session matches the user plane encryption protection information of the EPS. Alternatively, the integrity protection information indicates that the PDU session is not integrity protected, the encryption requirement information indicates that the PDU session is encrypted, the user plane encryption activation information indicates that user plane encryption of the EPS is activated, and the user plane security enforcement information of the PDU session matches the user plane encryption protection information of the EPS.

In a possible design, the user plane security enforcement information of the PDU session includes integrity protection requirement information and encryption requirement information, and the user plane encryption protection information of the EPS includes user plane encryption activation information, where the integrity protection requirement information indicates that the PDU session is integrity protected, and where the user plane security enforcement information of the PDU session does not match the user plane encryption protection information of the EPS.

In a possible design, when the user plane security enforcement information of the PDU session does not match the user plane encryption protection information of the EPS, the transmission management apparatus does not send an EBI assignment request to the access management apparatus.

In a possible design, the transmission management apparatus obtains the user plane security enforcement information based on the subscription information. Alternatively, the transmission management apparatus receives the user plane security enforcement information of the PDU session from a PCF based on the subscription information.

According to a second aspect, this application provides a method for assigning an EBI, including: An access management apparatus receives EBI assignment request information from a transmission management apparatus, where the EBI assignment request information is used to request to assign an EBI to an EPS bearer to which a QoS flow is mapped in an EPS; and when user plane security enforcement information of a PDU session in which the QoS flow is located matches user plane encryption protection information of an EPS, the access management apparatus sends an EBI assignment response to the transmission management apparatus, where the EBI assignment response carries the EBI assigned by the access management apparatus to the EPS bearer.

According to the foregoing description, when the access management apparatus receives the EBI assignment request information, the access management apparatus assigns, only when the user plane security enforcement information of the PDU session matches the user plane encryption protection information of the EPS, the EBI to the EPS bearer to which the QoS flow is mapped in the EPS, to avoid assigning an EBI that does not meet a user plane security requirement to the EPS bearer.

In a possible design, the user plane security enforcement information of the PDU session includes integrity protection requirement information and encryption requirement information, and the user plane encryption protection information of the EPS includes user plane encryption activation information, where the integrity protection requirement information indicates that the PDU session is not integrity protected, where the encryption requirement information indicates that the PDU session is not encrypted, and where the user plane security enforcement information of the PDU session matches the user plane encryption protection information of the EPS. Alternatively, the integrity protection requirement information indicates that the PDU session is not integrity protected, the encryption requirement information indicates that the PDU session is encrypted, the user plane encryption activation information indicates that user plane encryption of the EPS is activated, and the user plane security enforcement information of the PDU session matches the user plane encryption protection information of the EPS.

In a possible design, the user plane security enforcement information of the PDU session includes integrity protection requirement information and encryption requirement information, and the user plane encryption protection information of the EPS includes user plane encryption activation information, where when the integrity protection requirement information indicates that the PDU session is integrity protected, the user plane security enforcement information of the PDU session does not match the user plane encryption protection information of the EPS.

In a possible design, when the user plane security enforcement information of the PDU session does not match the user plane encryption protection information of the EPS, the access management apparatus sends the EBI assignment response information to the transmission management apparatus, where the EBI assignment response information carries cause information about an EBI assignment failure.

According to a third aspect, this application provides an EBI release method, including: An access management apparatus obtains user plane security enforcement information of a PDU session, where the PDU session includes at least one QoS flow, the QoS flow is associated with an EPS bearer, and an EBI has been assigned to the EPS bearer; and when the user plane security enforcement information of the PDU session does not match pre-stored or pre-configured user plane encryption protection information of the EPS, the access management apparatus sends EBI release request information to a transmission management apparatus that serves the EPS bearer, where the EBI release request information is used to indicate that the EPS bearer needs to be released.

According to the foregoing description, when the access management apparatus has assigned the EBI to the EPS to which the QoS flow is mapped in the EPS, the access management apparatus determines whether the user plane security enforcement information of the PDU session matches the user plane encryption protection information of the EPS, and when the user plane security enforcement information of the PDU session does not match the user plane encryption protection information of the EPS, the EBI previously assigned to the EPS is released, to prevent the EPS bearer from using an EBI that does not meet a user plane security requirement when a UE moves from a 5GS to an EPS.

In a possible design, the user plane security enforcement information of the PDU session includes integrity protection requirement information and encryption requirement information, and the user plane encryption protection information of the EPS includes user plane encryption activation information, where the integrity protection requirement information indicates that the PDU session is integrity protected, and where the user plane security enforcement information of the PDU session does not match the user plane encryption protection information of the EPS.

In a possible design, the user plane security enforcement information of the PDU session includes integrity protection requirement information and encryption requirement information, and the user plane encryption protection information of the EPS includes user plane encryption activation information, where the integrity protection requirement information indicates that the PDU session is not integrity protected, the encryption requirement information indicates that the PDU session is encrypted, the user plane encryption activation information indicates that user plane encryption of the EPS is activated, and the user plane security enforcement information of the PDU session matches the user plane encryption protection information of the EPS. Alternatively, the integrity protection requirement information indicates that the PDU session is not integrity protected, the encryption requirement information indicates that the PDU session is not encrypted, and the user plane security enforcement information of the PDU session matches the user plane encryption protection information of the EPS.

In a possible design, when the user plane security enforcement information of the PDU session matches the user plane encryption protection information of the EPS, the access management apparatus does not release the EBI of the EPS bearer.

In a possible design, before the access management apparatus obtains the user plane security enforcement information of the PDU session, the method further includes: The access management apparatus receives, in a PDU session establishment procedure or a PDU session modification procedure, a PDU session identifier and the user plane security enforcement information corresponding to the PDU session identifier from the transmission management apparatus.

In a possible design, the user plane encryption protection information of the EPS is from a mobility management device in the EPS.

According to another aspect, this application provides an apparatus for assigning an EBI. The apparatus is configured to implement a function of behavior of the transmission management apparatus in the possible designs of the first aspect. The function may be implemented by hardware, or may be implemented by hardware executing corresponding software. The hardware or the software includes one or more modules corresponding to the foregoing function.

In a possible design, a structure of the transmission management apparatus includes a processor and a transceiver. The processor is configured to determine whether user plane security enforcement information of a PDU session matches user plane encryption protection information of an EPS. The transceiver unit is configured to: when a result determined by the processor is yes, send EBI assignment request information to an access management apparatus, where the EBI assignment request information is used to request to assign an EBI to an EPS bearer to which a QoS flow is mapped in the EPS, and the PDU session includes at least one QoS flow. The transmission management apparatus may further include a memory. The memory is configured to couple to the processor and store a program instruction and data that are necessary for a network device.

According to another aspect, this application provides an apparatus for assigning an EBI. The apparatus has a function of implementing behavior of the access management apparatus in the possible designs of the second aspect. The function may be implemented by hardware, or may be implemented by hardware executing corresponding software. The hardware or the software includes one or more modules corresponding to the foregoing function. The module may be software and/or hardware.

In a possible design, a structure of the access management apparatus includes a transceiver and a processor. The transceiver is configured to receive EBI assignment request information from a transmission management apparatus, where the EBI assignment request is used to request to assign an EBI to an EPS bearer to which a QoS flow is mapped in an EPS. The processor is configured to determine whether user plane security enforcement information of a PDU session in which the QoS flow is located matches user plane encryption protection information of the EPS. The transceiver is further configured to: when a result determined by the processing unit is yes, send EBI assignment response information to the transmission management apparatus, where the EBI assignment response information carries the EBI assigned by the access management apparatus to the EPS bearer. The access management apparatus may further include a memory. The memory is configured to couple to the processor and store a program instruction and data that are necessary for a network device.

According to another aspect, this application provides an apparatus for assigning an EBI. The apparatus has a function of implementing behavior of the access management apparatus in the possible designs of the third aspect. The function may be implemented by hardware, or may be implemented by hardware executing corresponding software. The hardware or the software includes one or more modules corresponding to the foregoing function. The module may be software and/or hardware.

In a possible design, a structure of the access management apparatus includes a transceiver and a processor. The processor is configured to obtain user plane security enforcement information of a PDU session, where the PDU session includes at least one QoS flow, the QoS flow is associated with an EPS bearer, and an EBI has been assigned to the EPS bearer. The processor is further configured to determine whether the user plane security enforcement information of the PDU session matches pre-stored or pre-configured user plane encryption protection information of the EPS. The transceiver is configured to: when a result determined by the processing unit is no, send an EBI release request to a transmission management apparatus that serves the EPS bearer, where the EBI release request is used to indicate that the EBI of the EPS bearer needs to be released. The access management apparatus may further include a memory. The memory is configured to couple to the processor and store a program instruction and data that are necessary for a network device.

According to another aspect, this application provides a computer storage medium, including an instruction. When the instruction is run on a computer, the computer is enabled to perform the method according to any one of the first aspect to the possible implementations of the first aspect.

According to another aspect, this application provides a computer program product including an instruction. When the computer program product runs on a computer, the computer is enabled to perform the method according to any one of the first aspect to the possible implementations of the first aspect.

According to another aspect, this application provides a computer storage medium, including an instruction. When the instruction is run on a computer, the computer is enabled to perform the method according to any one of the second aspect to the possible implementations of the second aspect.

According to another aspect, this application provides a computer program product including an instruction. When the computer program product runs on a computer, the computer is enabled to perform the method according to any one of the second aspect to the possible implementations of the second aspect.

According to another aspect, this application provides a computer storage medium, including an instruction. When the instruction is run on a computer, the computer is enabled to perform the method according to any one of the third aspect to the possible implementations of the third aspect.

According to another aspect, this application provides a computer program product including an instruction. When the computer program product runs on a computer, the computer is enabled to perform the method according to any one of the third aspect to the possible implementations of the third aspect.

DESCRIPTION OF EMBODIMENTS

Figure 1A:
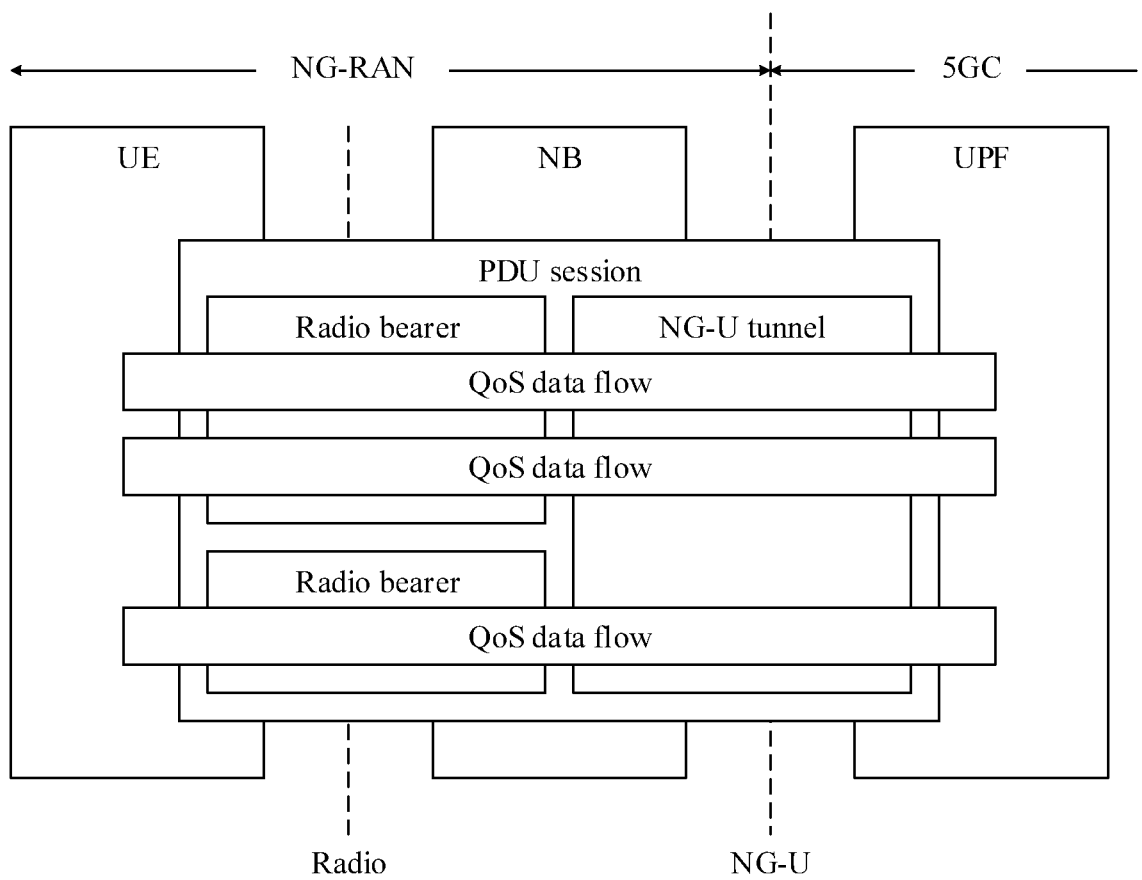
FIG. 1A is a schematic diagram of mapping of a QoS flow in a 5GS according to an embodiment of the present disclosure.
Figure 1B:
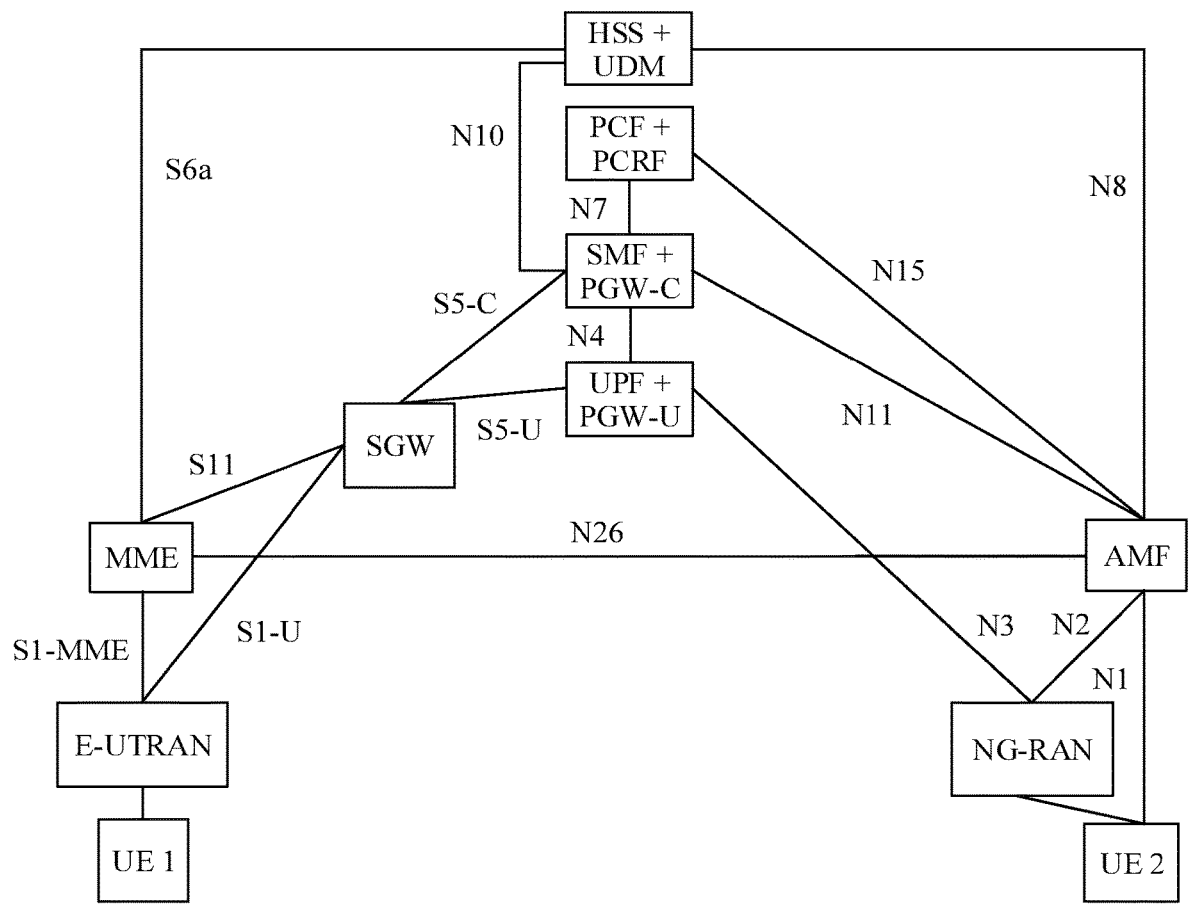
FIG. 1B is another schematic structural diagram of a communications system according to an embodiment of the present disclosure.

FIG. 1B is an architectural diagram of a communications system in a non-roaming case based on interworking between a 5GS and an EPS (Non-roaming architecture for interworking between 5GS and Evolved Packet Core (EPC)/ Evolved Universal Terrestrial Radio Access Network (E-UTRAN) according to an embodiment of the present disclosure. The communications system in FIG. 1B includes: unified data management (UDM)+home subscriber server (UDM+HSS), policy and charging function (PCF)+policy and charging rules function (PCF+PCRF), session management function (SMF)+PDN gateway (PGW) control plane (SMF+PGW-C), user plane function (UPD)+ PDN gateway user plane (UPF+PGW-U), a serving gateway (SGW), a mobility management entity (MME), an E-UTRAN, a user equipment (UE) 1, an access and mobility management function (AMF), a next generation (NG) radio access network (NG-RAN), and UE 2. The UDM+HSS is a network element obtained by integrating the HSS in the EPS with the UDM in the 5GS, the PCF+PCRF is a network element obtained by integrating the PCRF in the EPS with the PCF in the 5GS, the SMF+PGW-C is a network element obtained by integrating the PGW-C in the EPS with the SMF in the 5GS, and the UPF+PGW-U is a network element obtained by integrating the PGW-U in the EPS with the UPF in the 5GS. The MME and the E-UTRAN are network elements in the EPS, the AMF and the NG-RAN are network elements in the 5GS, the UE 1 accesses (a core network) through the E-UTRAN, the UE 2 accesses (a core network) through the NG-RAN, and the UE 1 and the UE 2 may refer to a same UE.

The following describes each interface in the communications system in FIG. 1B.

An S6a interface indicates a communications interface between the MME and the HSS+UDM. An S11 interface indicates a communications interface between the MME and the SGW. An S1-MME interface indicates a communications interface between the MME and the E-UTRAN. An S1-U interface indicates a communications interface between the E-UTRAN and the SGW. An N10 interface indicates a communications interface between the HSS+ UDM and the SMF+PGW-C. An S5-C interface indicates a control-plane communications interface between the SGW and the SMF+PGW-C. An S5-U interface indicates a user-plane communications interface between the SGW and the UPF+PGW-U. An N7 interface indicates a communications interface between the PCF+PCRF and the SMF+PGW-C. An N4 interface indicates a communications interface between the SMF+PGW-C and the UPF+PGW-U. An N8 interface indicates a communications interface between the HSS+UDM and the AMF. An N15 interface indicates a communications interface between the PCF+PCRF and the AMF. An N11 interface indicates a communications interface between the SMF+PGW-C and the AMF. An N3 interface indicates a communications interface between the UPF+PGW-U and the NG-RAN. An N2 interface indicates a communications interface between the NG-RAN and the AMF. An N1 interface indicates a communications interface between the AMF and the UE.

Figure 1C:
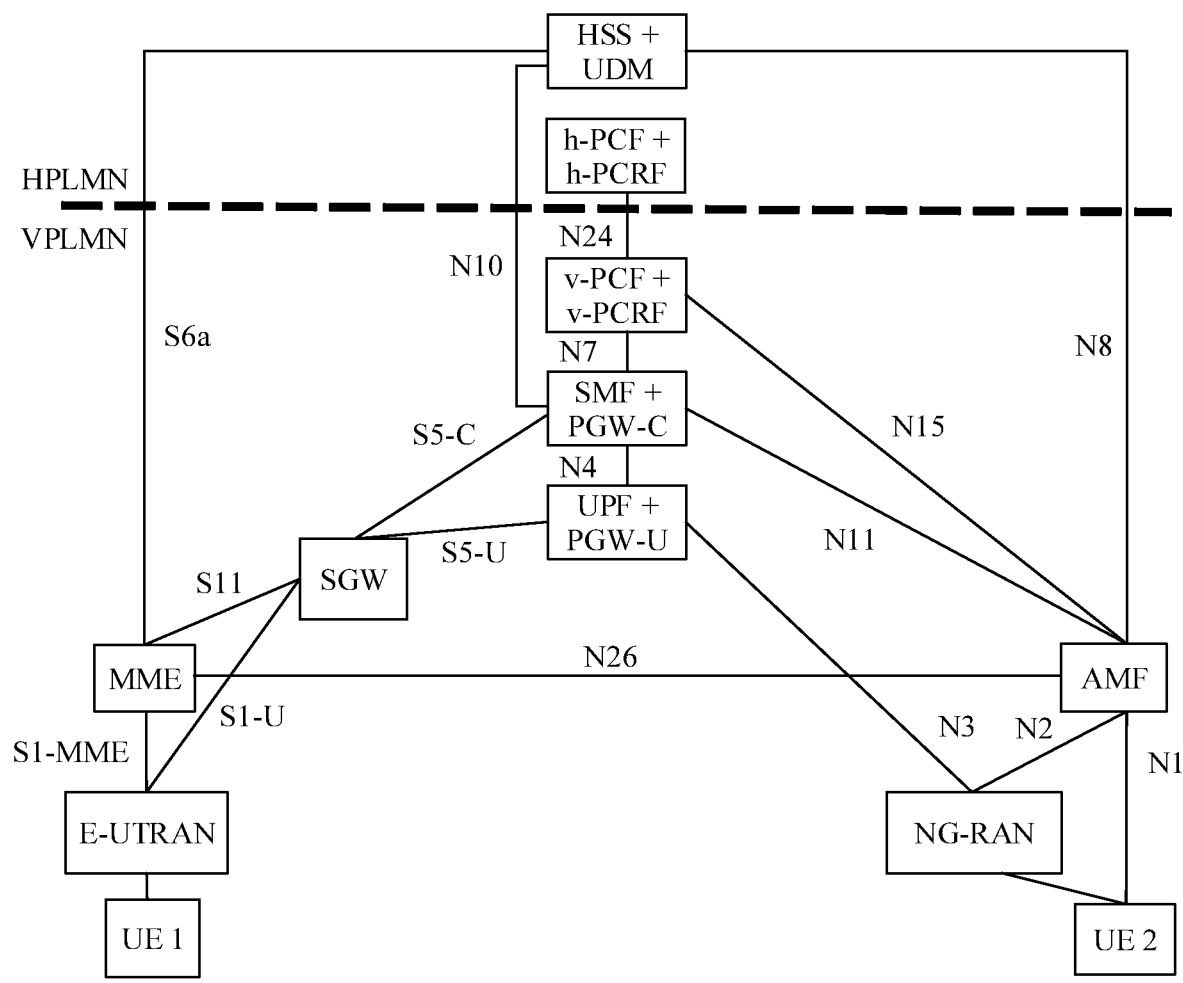
FIG. 1C is another schematic structural diagram of a communications system according to an embodiment of the present disclosure.

FIG. 1C is an architectural diagram of a communications system in a local breakout roaming case based on interworking between a 5GS and an EPS (Local breakout roaming architecture for interworking between 5GS and EPC/E-UTRAN) according to an embodiment of the present disclosure. The communications system in FIG. 1C includes UDM+HSS, home policy and charging function (h-PCF)+ home policy and charging rules function (h-PCF+h-PCRF), visited policy and charging function (v-PCF)+visited policy and charging rules function (v-PCF+v-PCRF), SMF+PGW-C, UPF+PGW-U, SGW, MME, E-UTRAN, UE 1, AMF, NG-RAN, and UE 2. The UDM+HSS is a network element obtained by integrating the HSS in the EPS with the UDM in the 5GS, the h-PCF+h-PCRF and the v-PCF+v-PCRF are network elements obtained by integrating the PCRF in the EPS with the PCF in the 5GS, the SMF+PGW-C is a network element obtained by integrating the PGW-C in the EPS with the SMF in the 5GS, and the UPF+PGW-U is a network element obtained by integrating the PGW-U in the EPS with the UPF in the 5GS. The MME and the E-UTRAN are network elements in the EPS, the AMF and the NG-RAN are network elements in the 5GS, the UE 1 camps on the E-UTRAN, and the UE 2 camps on the NG-RAN. The HSS+UDM is located in a home public land mobile network (HPLMN), and other network elements in the communications system are located in a visited public land mobile network (VPLMN).

The following describes each interface in the communications system in FIG. 1C.

An S6a interface indicates a communications interface between the MME and the HS S+UDM. An S11 interface indicates a communications interface between the MME and the SGW. An S1-MME interface indicates a communications interface between the MME and the E-UTRAN. An S1-U interface indicates a communications interface between the E-UTRAN and the SGW. An N10 interface indicates a communications interface between the HSS+ UDM and the SMF+PGW-C. An S5-C interface indicates a control-plane communications interface between the SGW and the SMF+PGW-C. An S5-U interface indicates a user-plane communications interface between the SGW and the UPF+PGW-U. An N24 interface indicates a communications interface between the h-PCF+h-PCRF and the v-PCF+ v-PCRF, and an N7 interface indicates a communications interface between the v-PCF+v-PCRF and the SMF+PGW-C. An N4 interface indicates a communications interface between the SMF+PGW-C and the UPF+PGW-U. An N8 interface indicates a communications interface between the HSS+UDM and the AMF. An N15 interface indicates a communications interface between the v-PCF+v-PCRF and the AMF. An N11 interface indicates a communications interface between the SMF+PGW-C and the AMF. An N3 interface indicates a communications interface between the UPF+PGW-U and the NG-RAN. An N2 interface indicates a communications interface between the NG-RAN and the AMF. An N1 interface indicates a communications interface between the AMF and the UE.

Figure 1D:
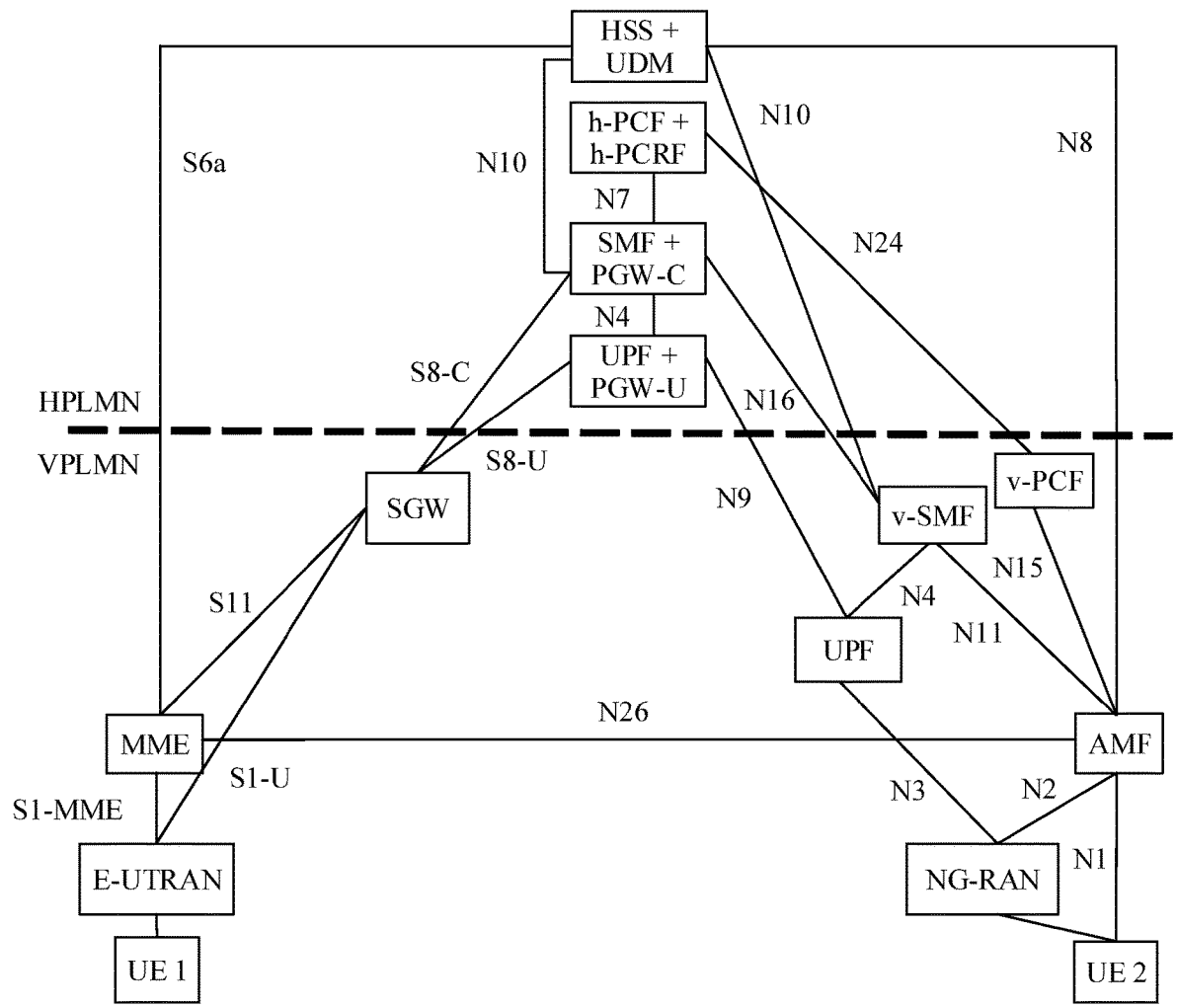
FIG. 1D is another schematic structural diagram of a communications system according to an embodiment of the present disclosure.

FIG. 1D is an architectural diagram of a communications system in a home-routed roaming case based on interworking between a 5GS and an EPS (Home-routed roaming architecture for interworking between 5GS and EPC/E-UTRAN) according to an embodiment of the present disclosure. The communications system in FIG. 1D includes HSS+UDM, h-PCF+h-PCRF, SMF+PGW-C, UPF+PGW-U, SGW, MME, E-UTRAN, UE 1, v-PCF, v-SMF, UPF, AMF, NG-RAN, and UE 2. The HSS+UDM is a network element obtained by integrating the HSS in the EPS with the UDM in the 5GS. The h-PCF+h-PCRF is a network element obtained by integrating the PCF in the 5GS with the PCRF in the EPS. The SMF+PGW-C is a network element obtained by integrating the SMG in the 5GS with the PGW-C in the EPS. The UPF+PGW-U is a network element obtained by integrating the UPF in the 5GS with the PGW-U in the EPS. The HSS+UDM, h-PCF+h-PCRF, SMF+PGW-C and the UPF+PGW-U are located in an HPLMN, and other network elements in the communications system are located in a VPLMN.

The following describes each interface in the communications system in FIG. 1D.

An S6a interface indicates a communications interface between the MME and the HS S+UDM. An S11 interface indicates a communications interface between the MME and the SGW. An S1-MME interface indicates a communications interface between the MME and the E-UTRAN. An S1-U interface indicates a communications interface between the E-UTRAN and the SGW. An N10 interface indicates a communications interface between the HSS+UDM and the SMF+PGW-C. An N7 interface indicates a communications interface between the h-PCF+h-PCRF and the SMF+PGW-C. An N4 interface indicates a communications interface between the SMF+PGW-C and the UPF+PGW-U. An S8-C interface indicates a control-plane communications interface between the SMF+PGW-C and the SGW. An S8-U interface indicates a user-plane communications interface between the SGW and the UPF+PGW-U. An N26 interface indicates a communications interface between the MME and the AMF. An N10 interface indicates a communications interface between the HSS+UDM and the v-SMF. An N24 interface indicates a communications interface between the h-PCF+h-PCRF and the v-PCF. An N16 interface indicates a communications interface between the SMF+PGW-C and the v-SMF. An N9 interface indicates a communications interface between the UPF+PGW-U and the UPF. An N15 interface indicates a communications interface between the v-PCF and the AMF. An N11 interface indicates a communications interface between the v-SMF and the AMF. An N4 interface indicates a communications interface between the UPF and the v-SMF. An N3 interface indicates a communications interface between the UPF and the NG-RAN. An N2 interface indicates a communications interface between the AMF and the NG-RAN. An N1 interface indicates a communications interface between the UE and the AMF.

The following describes functions of the network elements in FIG. 1B, FIG. 1C, and FIG. 1D.

The UPF+PGW-U is used for user data transmission management. In an EPS and 5GS interworking architecture, the UPF+PGW-U can be used for both EPS data transmission and 5G data transmission.

The SMF+PGW-C is used for session establishment, deletion, and modification management. In an interworking architecture, the network element provides both EPS session management and 5G session management.

The PCF+PCRF is used as a policy and charging control entity. In an interworking architecture, the network element can provide both EPS policy and charging control and 5G policy and charging control for a terminal apparatus.

The HSS+UDM is used to store subscription data of a user. In an interworking architecture, the network element stores both EPS subscription information of a terminal device and 5G subscription information of the terminal device.

A 5G radio access network (RAN) provides a wireless air interface for a terminal apparatus to access a core network, to obtain a corresponding service.

The evolved universal terrestrial radio access network (E-UTRAN) is used for radio resource management, and establishes, modifies, or deletes an air interface resource for a terminal apparatus, and provides data and signaling transmission, and the like for the terminal apparatus.

The AMF is used for access and mobility management of a user, mainly including registration management, accessibility management, mobility management, paging management, access authentication, authorization of encryption and integrity protection on non-access stratum signaling, and the like of the user.

The MME is used for mobility management of a user. For example, the MME mainly includes attach management, accessibility management, mobility management, paging management, access authentication, authorization of encryption and integrity protection on non-access stratum signaling, and the like of the user.

The SGW is a gateway on a user plane, and is a termination point on the user plane of the E-UTRAN. The SGW serves as a local mobility anchor for handovers between base stations. The SGW manages data packet routing and transmission, adds a packet tag of a transport layer, and the like.

The UE in this application is a device having a wireless communication function, and may be deployed on the land, including an indoor or outdoor device, a handheld device, a wearable device, or a vehicle-mounted device; may be deployed on the water (for example, on a ship); or may be deployed in the air (for example, on an aircraft, a balloon, or a satellite). The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. Alternatively, the terminal device may be a handheld device, a vehicle-mounted device, a wearable device, a computing device, another processing device connected to a wireless modem, or the like that has a wireless communication function. The terminal device may have different names in different networks, for example, a terminal device, an access terminal, a subscriber unit, a subscriber station, a mobile station, a mobile console, a remote station, a remote terminal, a mobile device, a user terminal, a terminal, a wireless communications device, a user agent, a user apparatus, a cellular phone, a cordless phone, a session initiation protocol (SIP) phone, a wireless local loop (WLL) station, a personal digital assistant (PDA), or a terminal device in a 5G network or a future evolved network.

Figure 1E:
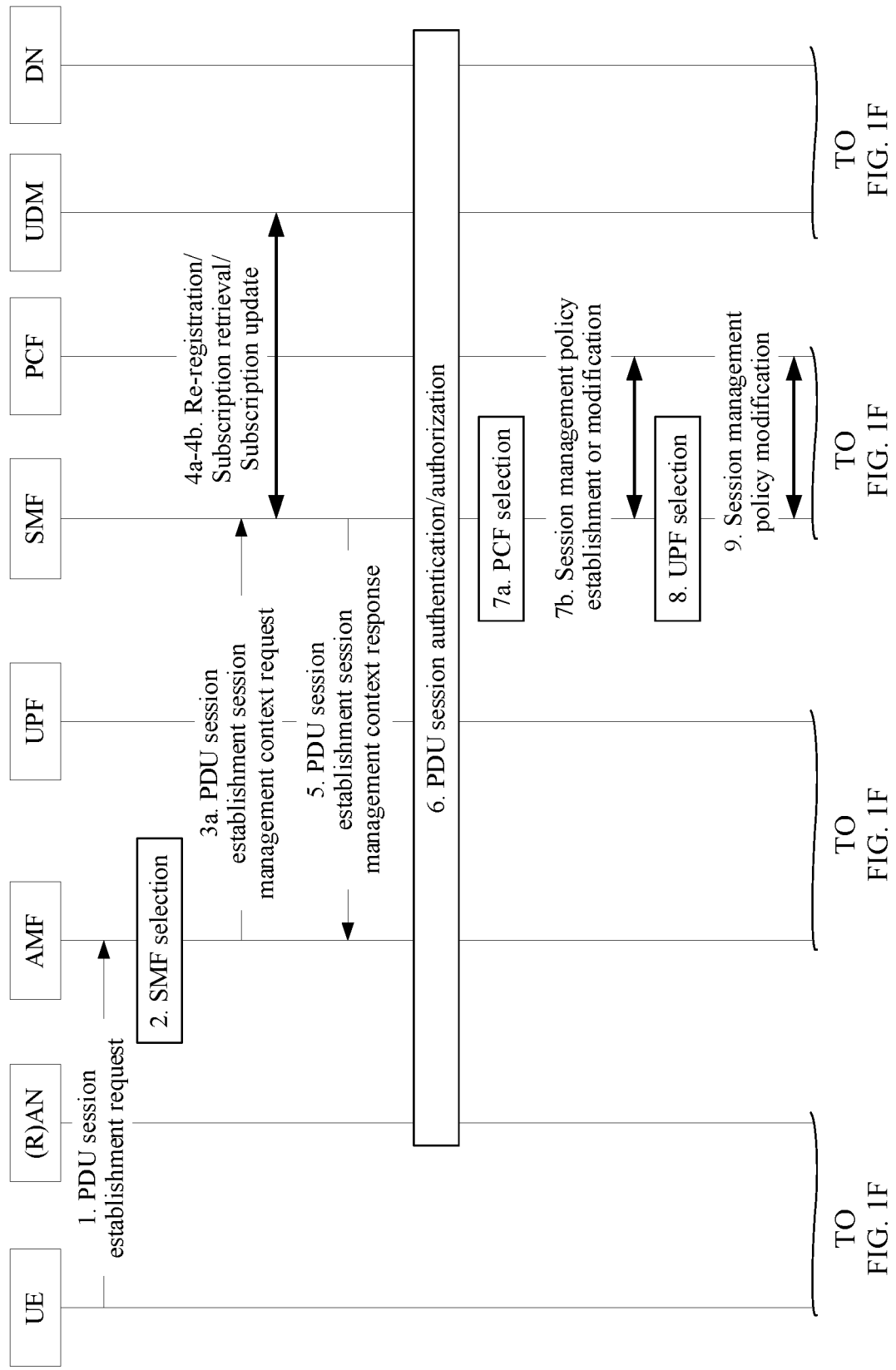
FIG. 1E and FIG. 1F are schematic diagrams of a PDU session establishment procedure according to an embodiment of the present disclosure.
Figure 1F:
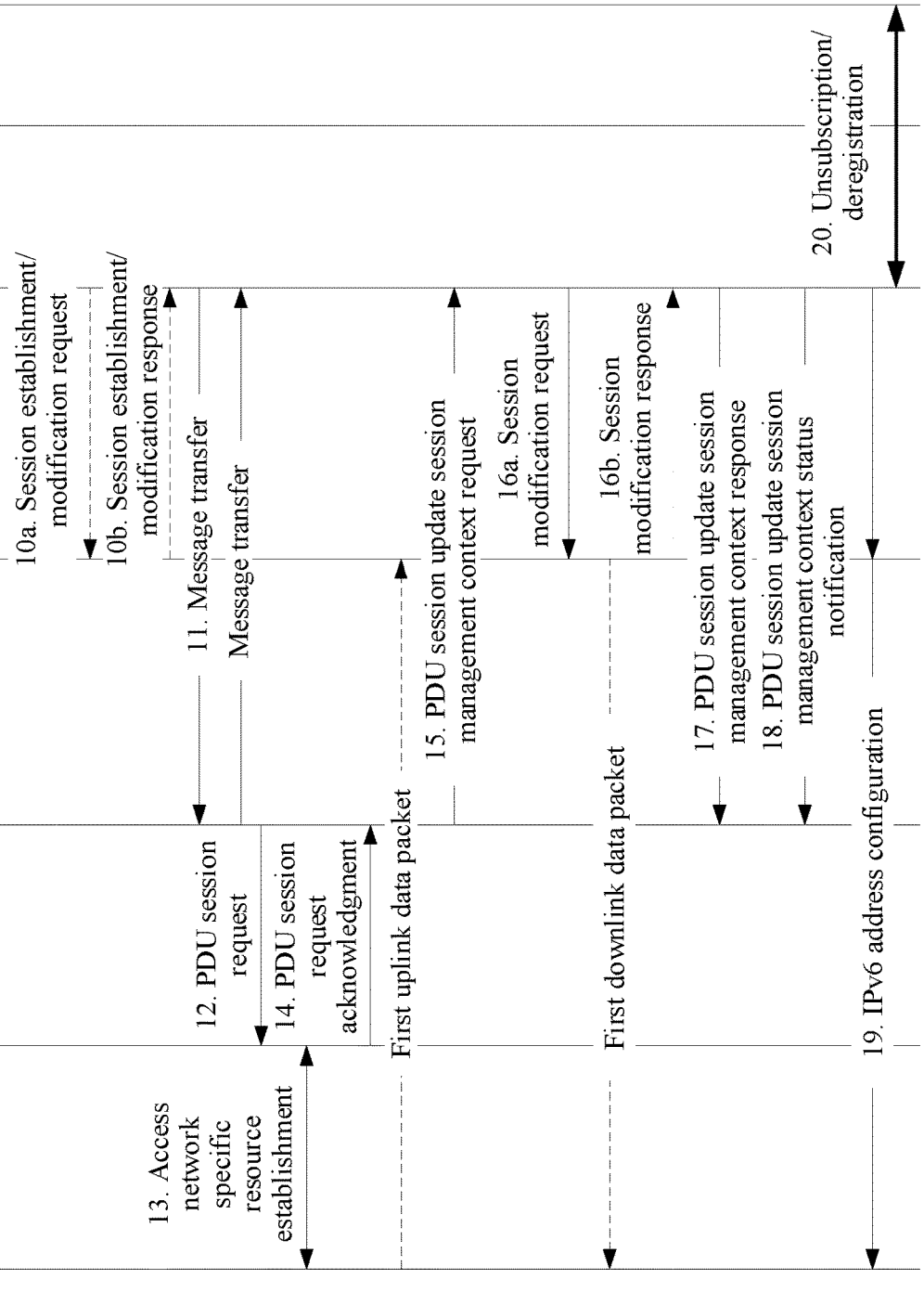

FIG. 1E and FIG. 1F are a schematic diagram of a PDU session establishment procedure in a 5GS according to an embodiment of the present disclosure. The procedure includes the following steps.

1. A UE sends a PDU session establishment request to an AMF, and the AMF receives the PDU session establishment request from the UE. The PDU session establishment request is used to establish a PDU session in the 5GS.

2. The AMF selects an SMF.

3a. The AMF sends the PDU session establishment request to the SMF, and the SMF receives the PDU session establishment request from the AMF. The SMF may send the PDU session establishment request to the AMF through a Nsmf interface.

4a and 4b. The SMF registers with the UDM, and obtains subscription information from the UDM. The subscription information includes a user plane security policy.

5. The SMF sends a PDU session establishment response to the AMF, and the AMF receives the PDU session establishment response from the SMF. The SMF may reject PDU session establishment in this step, and carry a rejection cause value in the PDU session establishment response.

6. Authentication/Authorization of the PDU session.

7a and 7b. The SMF selects a PCF. The SMF requests a policy rule from the PCF. The SMF may obtain a dynamic user plane security policy of the PDU session from the PCF, to update the user plane security policy in the subscription information.

8. The SMF selects a UPF.

9. The SMF sends PDU session related information (for example, an Internet Protocol (IP) address/prefix of the UE and a trigger status) to the PCF, and the PCF receives the PDU session related information reported by the SMF.

10a and 10b. The SMF sends tunnel information and rule information to the UPF, and the UPF receives the tunnel information and the rule information from the SMF.

11. The SMF sends, to the AMF, a PDU session identifier, and session management (SM) information and a SM container that are associated with the PDU session identifier.

12. The AMF sends a PDU session request to an NG-RAN, and the RAN receives the PDU session request from the AMF. The PDU session request includes the SM information and a NAS message. The AMF sends the SM information to the RAN through an N2 interface, and sends the NAS message including the SM container to the RAN through the N2 interface. In other words, the AMF sends the SM container to the RAN in a transparent transmission manner. The SM information protects user plane policy enforcement of the PDU session.

13. The NG-RAN and the UE perform an access network specific resource setup (AN specific resource setup). In the procedure, the NR-RAN sends a PDU session establishment accept to the UE.

14. The NG-RAN sends a PDU session request acknowledgment (ACK) to the AMF, and the AMF accepts the PDU session request acknowledgment from the NG-RAN.

15. The AMF sends an update session management context request (e.g., a PDU session update SM context request) to the SMF, and the SMF accepts the update session management context request from the AMF. The request can be sent through the Nsmf interface.

16a. The SMF sends a session modification request to the UPF, and the UPF receives the session modification request from the SMF. The request can be sent through an N4 interface.

16b. The UPF sends a session modification response to the SMF, and the SMF receives the session modification response from the SMF. The response can be sent through the N4 interface.

17. The SMF sends an update session management context response (e.g., a PDU session update SM context response) to the AMF, and the AMF receives the PDU session update SM context response from the SMF.

18. The SMF sends a session management context status notification (e.g., a PDU session SM context status notify message) to the AMF, and the AMF receives the session management context status notification from the SMF.

19. The SMF configures IPv6 addresses for the UPF and the UE.

20. The SMF and UDM perform an unsubscription/deregistration procedure.

Figure 1G:
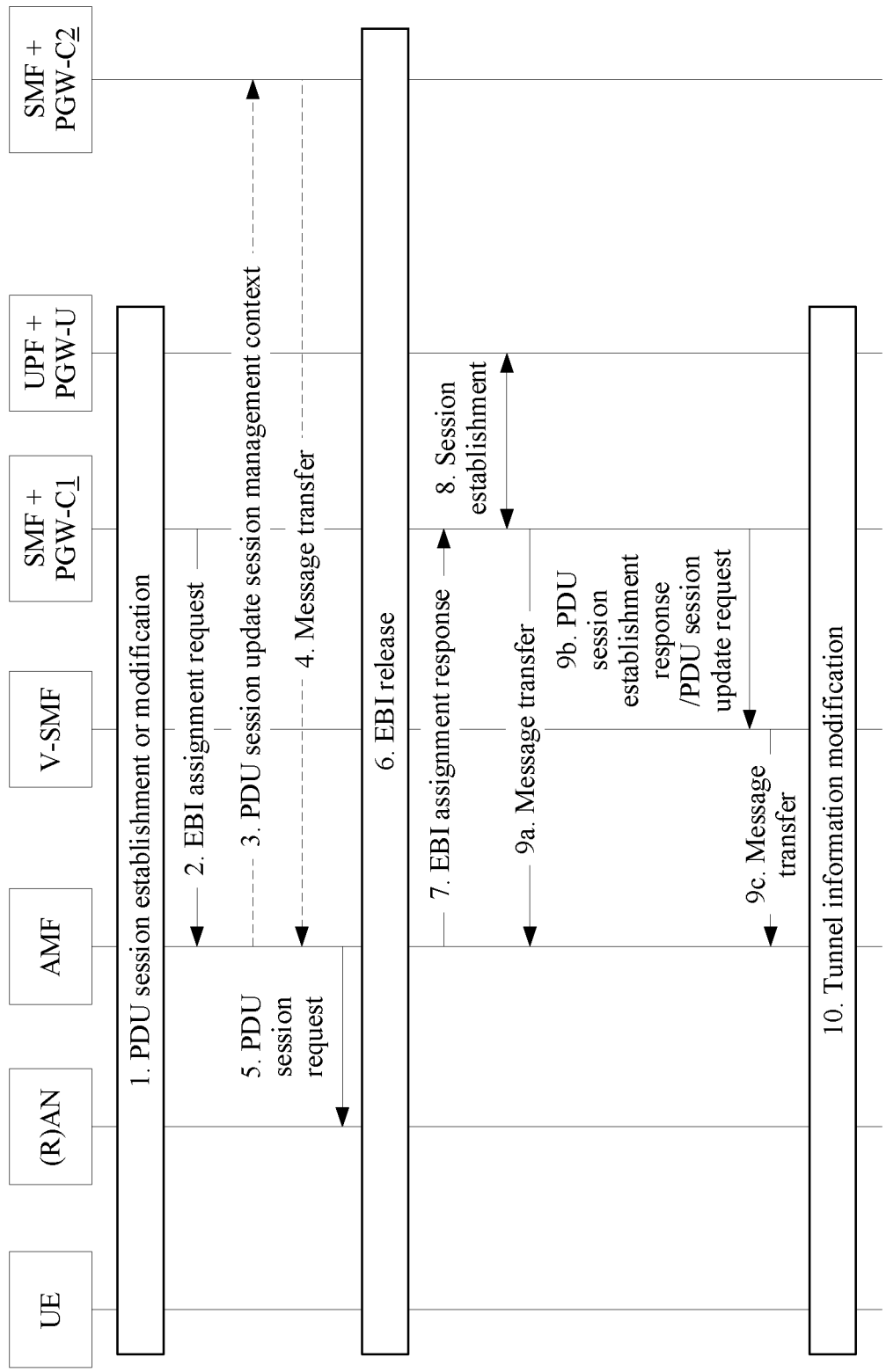
FIG. 1G is a schematic flowchart of a method for assigning an EBI according to an embodiment of the present disclosure.

FIG. 1G is an EBI assignment procedure according to an embodiment of the present disclosure. The procedure includes the following steps.

1. During creation of a default QoS flow or a GBR QoS flow establishment, the PGW-C+SMF requests an EBI from the AMF for a corresponding default EPS bearer/dedicated GBR EPS bearer.

In the 5GS, the default QoS flow is created during a PDU session establishment procedure initiated by UE, and the GBR QoS flow is created during a PDU session modification procedure initiated by UE or a network side.

2. The SMF sends an EBI assignment request to the AMF. The EBI assignment request carries a PDU session identifier and an allocation and preemption (ARP) priority list. A Namf_Communication_EBIAssignment service request requests the EBI assigned by the AMF, where the service request carries the PDU Session ID and the ARP list.

Steps 3 to 6 apply only when the AMF needs to release the EBI previously assigned for the UE. (Note: A quantity of EBIs in the EPS is limited.)

3. If the AMF has no available EBIs, the AMF may revoke the previously assigned EBI based on the ARP and the S-NSSAI, and send an update session management context request to the SMF+PGW-C that serves the EPS bearer. (Note: The AMF may assign EBIs to a plurality of SMFs. Therefore, the SMF in this step may be different from the SMF that sends the request to the AMF in step 2.)

4. The SMF sends an N1 session management container (N1 SM container) and N2 session management information (N2 SM information) to the AMF, to notify the UE and the RAN of to-be-released EBIs, respectively.

5. If the UE is in a connection management (CM)_IDLE state, the AMF first pages the UE, and then the UE initiates a service request procedure. In the service request procedure, the AMF sends an N2 SM information element (IE) and an N1 SM container IE that are included in an N2 session message to the RAN and the UE, respectively.

If the UE is in a CM_CONNECTED state, the AMF sends an N2 SM information IE and an N1 SM container IE that are included in an N2 session request message to the RAN and the UE, respectively.

6. The UE triggers a PDU session modification procedure.

7. If the AMF successfully assigns the EBI, the AMF sends an EBI assignment response to the SMF+PGW-C. If the AMF successfully assigns the EBI, the EBI assignment response carries the assigned EBI. If the AMF fails to assign the EBI, the EBI assignment response carries a failure cause value. For example, the failure cause value indicates that there is an insufficient quantity of EBIs, and the AMF responds to the SMF with the assigned EBI. If the assignment fails, the AMF responds with a cause value indicating an EBI assignment failure.

8. The SMF+PGW-C modifies user-plane tunnel information.

9. The SMF sends the N1 SM container and the N2 SM information to the AMF, to notify the UE and the RAN of to-be-released EBIs, respectively.

10. The AMF sends the assigned EBI to the UE and RAN. The UE, the RAN, and the network side modify the tunnel information.

As shown in the EBI assignment procedure in FIG. 1G, after receiving the EBI assignment request from the SMF+PGW-C, the AMF assigns the EBI to the EPS bearer. Because a user plane security requirement of the 5GS is higher than a user plane security capability of the EPS, after a PDU session that supports EPS migration is migrated to the EPS, the user plane security capability of the EPS may not meet a user plane security requirement of the PDU session. In this case, the EBI assigned in advance to the EPS bearer to which the QoS flow in the PDU session is mapped in the EPS is unavailable. Consequently, a limited quantity of EBI resources in the EPS are wasted, and unnecessary signaling overheads are increased. To resolve the foregoing problem, this application provides solutions in FIG. 2 to FIG. 4.

Figure 2:
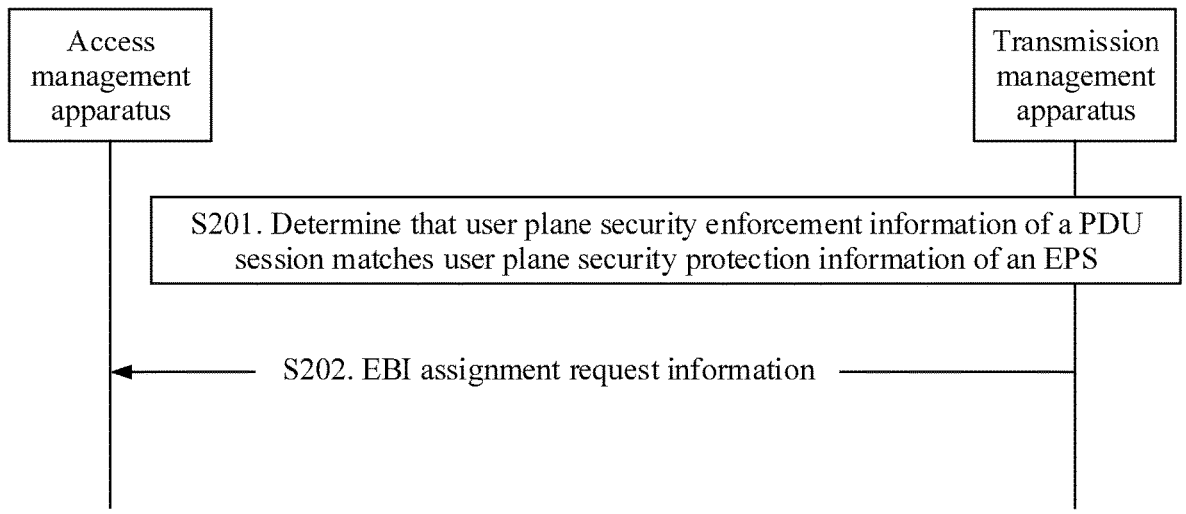
FIG. 2 is another schematic flowchart of a method for assigning an EBI according to an embodiment of the present disclosure.

FIG. 2 is a schematic flowchart of a method for assigning an EBI according to an embodiment of the present disclosure. In this embodiment of the present disclosure, the method includes the following steps.

S201. A transmission management apparatus determines that user plane security enforcement information of a PDU session matches user plane security protection information of an EPS.

For example, one or more QoS flows may be established in the PDU session, and the PDU session supports migration to the EPS. In other words, the PDU session supports establishment of a corresponding PDN connection in the EPS. For a QoS flow, the QoS flow is mapped to an EPS bearer in the EPS. The EPS bearer mapped to the QoS flow indicates an EPS bearer corresponding to the QoS flow that is in the 5GS in the EPS. After UE moves from the 5GS to the EPS, the UE establishes a PDN connection corresponding to the PDU session in the EPS. Correspondingly, the QoS flow in the PDU session maps the EPS bearer in the PDN connection. After the PDN connection is successfully established, the UE initiates a PDU session release procedure, and correspondingly, the one or more QoS flows in the PDU session are also released. In this embodiment of the present disclosure, in any one of the following cases, it indicates that an EBI needs to be assigned to the EPS bearer to which the QoS flow is mapped in the EPS: 1. In the non-roaming case in FIG. 1B and the local breakout roaming case in FIG. 1C, the UE initiates PDU session establishment. 2. In the home-routed roaming case in FIG. 1D, the UE initiates PDU session establishment. 3. In the non-roaming case in FIG. 1B and the local breakout roaming case in FIG. 1C, the UE or a network initiates PDU session modification. 4. In the home-routed roaming case in FIG. 1D, the UE or a network initiates PDU session modification. The transmission management apparatus in this embodiment is configured to manage a PDU session in the 5GS, and manage a PDN connection in the EPS, including being responsible for establishment, modification, and deletion of the PDU session, and establishment, modification, and deletion of the PDN connection. The transmission management apparatus may include an SMF and a PGW-C, or may be an apparatus that has functions of an SMF and a PGW-C.

In the non-roaming case, a home network provides a service for the UE. In the home-routed roaming case, roaming access through a home network gateway (e.g., h-SMF+PGW-C or h-UPF+PGW-U) is performed, that is, a roaming subscriber accesses the home network through a home network gateway (e.g., H-PGW) to obtain a service provided by the home network. In the local breakout roaming case, a roaming subscriber accesses a visited network through a visited network gateway (e.g., v-SMF+PGW-C or v-UPF+PGW-U) to obtain a corresponding service, where the service may be provided by a home network or the visited network.

In a possible implementation, the transmission management apparatus obtains a session management policy of the PDU session from the PCF. The PDU session management policy includes a field indicating whether migration to the EPS is supported. For example, the session management policy includes a field of an EPS support indication. If a value of the EPS support indication is 1, the PDU session supports migration to the EPS. If a value of EPS support indication is 0, the PDU session does not support migration to the EPS.

In a possible implementation, that the transmission management apparatus obtains the user plane security enforcement information of the PDU session includes: An SMF+PGW-C pre-stores or pre-configures a mapping relationship between a PDU session identifier and the user plane security enforcement information; and the SMF+PGW-C determines, based on the mapping relationship, the user plane security enforcement information corresponding to the PDU session identifier; or an SMF+PGW-C obtains a subscribed user plane security policy from a UDM, where the user plane security policy includes the user plane security enforcement information; or an SMF+PGW-C obtains the corresponding user plane security enforcement information from a PCF.

In a possible implementation, that the transmission management apparatus obtains the user plane encryption protection information of the EPS includes: The transmission management apparatus pre-stores or pre-configures the user plane encryption protection information of the EPS, and an SMF locally obtains the user plane encryption protection information of the EPS; or the transmission management apparatus receives the user plane encryption protection information of the EPS that is sent by an MME in the EPS; or the transmission management apparatus receives the user plane encryption protection information of the EPS from a PCRF.

The transmission management apparatus determines whether the user plane security enforcement information of the PDU session matches the user plane encryption protection information of the EPS. Essentially, the transmission management apparatus determines whether a user plane security capability of the EPS can meet a user plane security requirement of the PDU session. If the user plane security enforcement information of the PDU session matches the user plane encryption protection information of the EPS, it indicates that the user plane security capability of the EPS meets the user plane security requirement of the PDU session. If the user plane security enforcement information of the PDU session does not match the user plane encryption protection information of the EPS, it indicates that the user plane security capability of the EPS does not meet the user plane security requirement of the PDU session.

In a possible implementation, the user plane security enforcement information of the PDU session includes integrity protection requirement information and encryption requirement information, and the user plane encryption protection information of the EPS includes user plane encryption activation information.

When the user plane security requirement information of the PDU session indicates that the PDU session is not integrity protected, and the user plane encryption protection information of the EPS indicates that user plane encryption of the EPS is activated, the user plane security enforcement information of the PDU session matches the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. When the transmission management apparatus determines that the integrity protection requirement information is not needed and the encryption requirement information is not needed, the transmission management apparatus does not need to parse the user plane encryption protection information. In other words, regardless of whether the user plane encryption activation information is activated or unactivated, the transmission management apparatus may directly determine that the user plane security enforcement information of the PDU session matches the user plane encryption protection information of the EPS.

In another possible implementation, when the integrity protection requirement information indicates that the PDU session is not integrity protected, the encryption requirement information indicates that the PDU session is encrypted, and the user plane encryption activation information indicates that user plane encryption of the EPS is activated, the user plane security enforcement information of the PDU session matches the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. When the transmission management apparatus determines that the integrity protection requirement information is not needed, the encryption requirement information is required, and the user plane encryption activation information is activated, the transmission management apparatus determines that the user plane security enforcement information of the PDU session matches the user plane encryption protection information of the EPS.

In another possible implementation, the user plane security enforcement information of the PDU session includes integrity protection requirement information.

When the integrity requirement information indicates that the PDU session is integrity protected, the user plane security enforcement information of the PDU session does not match the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. Because integrity protection is not supported on the user plane of the EPS, when the integrity protection requirement information is required, the transmission management apparatus does not need to parse the encryption protection requirement information and the user plane encryption activation information. In other words, the transmission management apparatus can directly determine that the user plane security enforcement information of the PDU session does not match the user plane encryption protection information of the EPS.

S203. The transmission management apparatus sends EBI assignment request information to an access management apparatus, and the access management apparatus receives the EBI assignment request information from the transmission management apparatus.

For example, when the transmission management apparatus determines that the user plane security enforcement information of the PDU session matches the user plane encryption protection information of the EPS, the transmission management apparatus sends the EBI assignment request information to the access management apparatus, where the EBI assignment request information carries a PDU session identifier, and the PDU session identifier indicates an identity of the PDU session; and the access management apparatus receives the EBI assignment request information sent by the transmission management apparatus.

When determining that there is an available EBI in the EPS, the access management apparatus assigns the available EBI to the EPS bearer; and when no EBI is available in the EPS, the access management apparatus initiates an EBI release procedure to release the previously assigned EBI, and then assigns the EBI to the EPS bearer. The access management apparatus sends an EBI assignment response to the SMF+PGW-C. If the EBI is successfully assigned to the EPS bearer, the EBI assignment response carries the assigned EBI. If no EBI is successfully assigned to the EPS, the EBI assignment response carries a cause value of an assignment failure. The access management apparatus may be an AMF in the 5GS.

In this embodiment, a determining condition used by the transmission management apparatus to send the EBI assignment request information to the access management apparatus is not limited to only the determining condition described in S201, and one or more other determining conditions may further be included. For example, another determining condition is that a data network name (DNN) of the PDU session is a local area data network (LADN). In other words, the transmission management apparatus sends the EBI assignment request information to the access management apparatus only when the user plane security enforcement information of the PDU session matches the user plane security protection information of the EPS, and the DNN of the PDU session is an LADN.

In a possible implementation, when the user plane security enforcement information of the PDU session does not match the user plane encryption protection information of the EPS, the transmission management apparatus does not send an EBI assignment request to the access management apparatus. In other words, the transmission management apparatus sends an EBI assignment request to the access management apparatus only when the user plane security enforcement information of the PDU session matches the user plane encryption protection information of the EPS, to avoid a waste of EBI resources and overheads of a signaling procedure caused by a failure of the user plane security capability of the EPS to meet a requirement of the PDU session.

Figure 3:
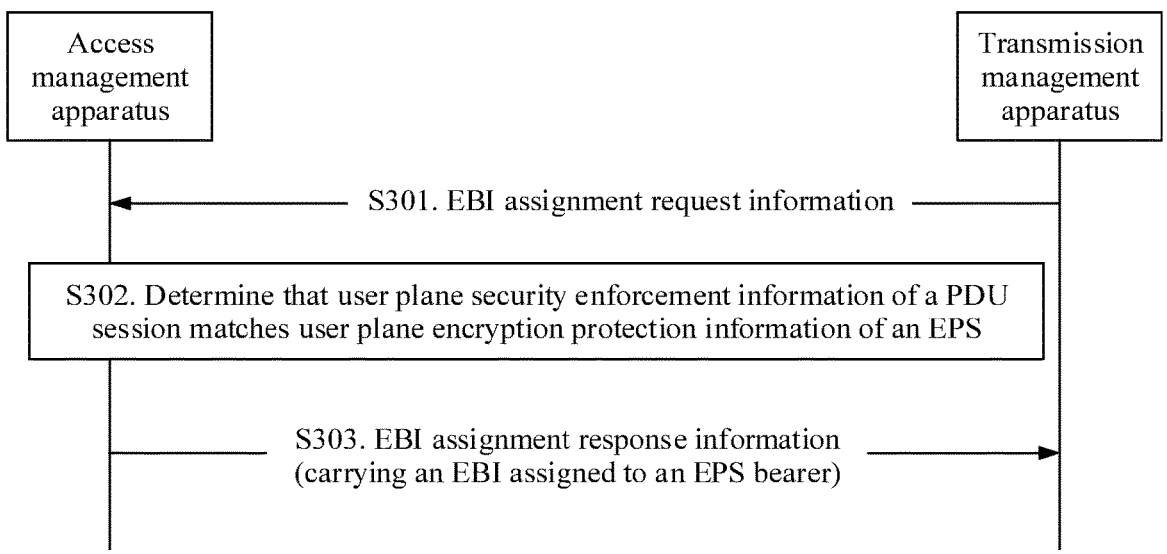
FIG. 3 is another schematic flowchart of a method for assigning an EBI according to an embodiment of the present disclosure.

FIG. 3 is another schematic flowchart of a method for assigning an EBI according to an embodiment of the present disclosure. In this embodiment of the present disclosure, the method includes the following steps.

S301. An access management apparatus receives EBI assignment request information sent by a transmission management apparatus, and the access management apparatus receives the EBI assignment request information sent by the transmission management apparatus.

For example, the access management apparatus is configured to perform access and mobility management of a UE in a 5GS, and the access management apparatus may be an AMF. The transmission management apparatus is configured to manage a PDU session in the 5GS, and manage a PDN connection in an EPS, including being responsible for establishment, modification, and deletion of the PDU session, and establishment, modification, and deletion of the PDN connection. The transmission management apparatus may include an SMF and a PGW-C, or may be an apparatus that has functions of an SMF and a PGW-C. The access management apparatus may be an AMF in the 5GS. When an EBI needs to be assigned to an EPS bearer to which a QoS flow is mapped in the EPS, the transmission management apparatus sends the EBI assignment request information to the access management apparatus, where the EBI assignment request information carries a PDU session identifier, where the PUD session identifier is an identity of the PDU session, where the PDU session includes the QoS flow, and where the PDU session supports migration to the EPS. After receiving the EBI assignment request information from the transmission management apparatus, the access management apparatus determines that the EBI needs to be assigned to the EPS bearer. The access management apparatus determines whether there is an available EBI in the EPS. If there is an available EBI, S302 is performed. If no EBI is available in the EPS, the access management apparatus initiates an EBI release procedure to release the previously assigned EBI, and when there is an available EBI in the EPS, S302 is then performed.

S302. The access management apparatus determines that user plane security enforcement information of the PDU session matches user plane encryption protection information of the EPS.

For example, the access management apparatus obtains the user plane security enforcement information of the PDU session, and obtains the user plane encryption protection information of the EPS. That the user plane security enforcement information of the PDU session matches the user plane encryption protection information of the EPS indicates that a user plane security capability of the EPS meets a security requirement of the PDU session.

In a possible implementation, that the access management apparatus obtains the user plane security enforcement information of the PDU session includes: The access management apparatus pre-stores or pre-configures a mapping relationship between a PDU session identifier and the user plane security enforcement information, and the AMF determines corresponding user plane security enforcement information based on the PDU session identifier in an EBI assignment request; or the AMF obtains, from a PCF, the user plane security enforcement information corresponding to a PDU session identifier; or the AMF obtains, from an SMF, the user plane security enforcement information corresponding to a PDU session identifier.

In a possible implementation, that the access management apparatus obtains the user plane encryption protection information of the EPS includes: The access management apparatus pre-stores or pre-configures the user plane encryption protection information of the EPS; or the access management apparatus receives the user plane encryption protection information of the EPS that is sent by an MME.

The access management apparatus determines whether the user plane security enforcement information of the PDU session matches the user plane encryption protection information of the EPS. Essentially, the access management apparatus determines whether a user plane security capability of the EPS can meet a user plane security requirement of the PDU session. If the user plane security enforcement information of the PDU session matches the user plane encryption protection information of the EPS, it indicates that the user plane security capability of the EPS meets the user plane security requirement of the PDU session. If the user plane security enforcement information of the PDU session does not match the user plane encryption protection information of the EPS, it indicates that the user plane security capability of the EPS does not meet the user plane security requirement of the PDU session.

In a possible implementation, the user plane security enforcement information of the PDU session includes integrity protection requirement information and encryption requirement information, and the user plane encryption protection information of the EPS includes user plane encryption activation information.

When the user plane security requirement information of the PDU session indicates that the PDU session is not integrity protected, and the user plane encryption protection information of the EPS indicates that user plane encryption of the EPS is activated, the user plane security enforcement information of the PDU session matches the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. When the transmission management apparatus determines that the integrity protection requirement information is not needed and the encryption requirement information is not needed, the transmission management apparatus does not need to parse the user plane encryption protection information. In other words, regardless of whether the user plane encryption activation information is activated or unactivated, the transmission management apparatus may directly determine that the user plane security enforcement information of the PDU session matches the user plane encryption protection information of the EPS.

In another possible implementation, when the integrity protection requirement information indicates that the PDU session is not integrity protected, the encryption requirement information indicates that the PDU session is encrypted, and the user plane encryption activation information indicates that user plane encryption of the EPS is activated, the user plane security enforcement information of the PDU session matches the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. When the transmission management apparatus determines that the integrity protection requirement information is not needed, the encryption requirement information is required, and the user plane encryption activation information is activated, the transmission management apparatus determines that the user plane security enforcement information of the PDU session matches the user plane encryption protection information of the EPS.

In another possible implementation, the user plane security enforcement information of the PDU session includes integrity protection requirement information.

When the integrity requirement information indicates that the PDU session is integrity protected, the user plane security enforcement information of the PDU session does not match the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. Because integrity protection is not supported on the user plane of the EPS, when the integrity protection requirement information is required, the transmission management apparatus does not need to parse the encryption protection requirement information and the user plane encryption activation information. In other words, the transmission management apparatus can directly determine that the user plane security enforcement information of the PDU session does not match the user plane encryption protection information of the EPS.

S303. The access management apparatus sends EBI assignment response information to the transmission management apparatus, and the access management apparatus receives the EBI assignment response information from the transmission management apparatus.

For example, when the user plane security enforcement information of the PDU session matches the user plane encryption protection information of the EPS, the access management apparatus assigns the EBI to the EPS bearer, and the access management apparatus sends an EBI assignment response to an SMF+PGW-C, where the EBI assignment response carries the EBI assigned to the EPS bearer.

In a possible implementation, when the user plane security enforcement information of the PDU session does not match the user plane encryption protection information of the EPS, the access management apparatus does not assign the EBI to the EPS bearer, and the access management apparatus sends the EBI assignment response to the transmission management apparatus. The EBI assignment response information carries a cause value of an assignment failure, and the cause value indicates that the user plane security requirement of the PDU session is not met.

In this embodiment, a determining condition used by the access management apparatus to send the EBI assignment response information carrying the assigned EBI to the transmission management apparatus is not limited to only the determining condition described in S302, and one or more other determining conditions may further be included. For example, another determining condition is that a data network name (DNN) of the PDU session is a local area data network (LADN). In other words, the access management apparatus sends the EBI assignment response information carrying the assigned EBI to the transmission management apparatus only when the user plane security enforcement information of the PDU session matches the user plane security protection information of the EPS, and the DNN of the PDU session is an LADN.

During implementation of this embodiment of the present disclosure, when the access management apparatus receives the EBI assignment request information, the access management apparatus assigns, only when the user plane security enforcement information of the PDU session matches the user plane encryption protection information of the EPS, the EBI to the EPS bearer to which the QoS flow is mapped in the EPS, to avoid assigning an EBI that does not meet the user plane security requirement to the EPS bearer.

Figure 4:
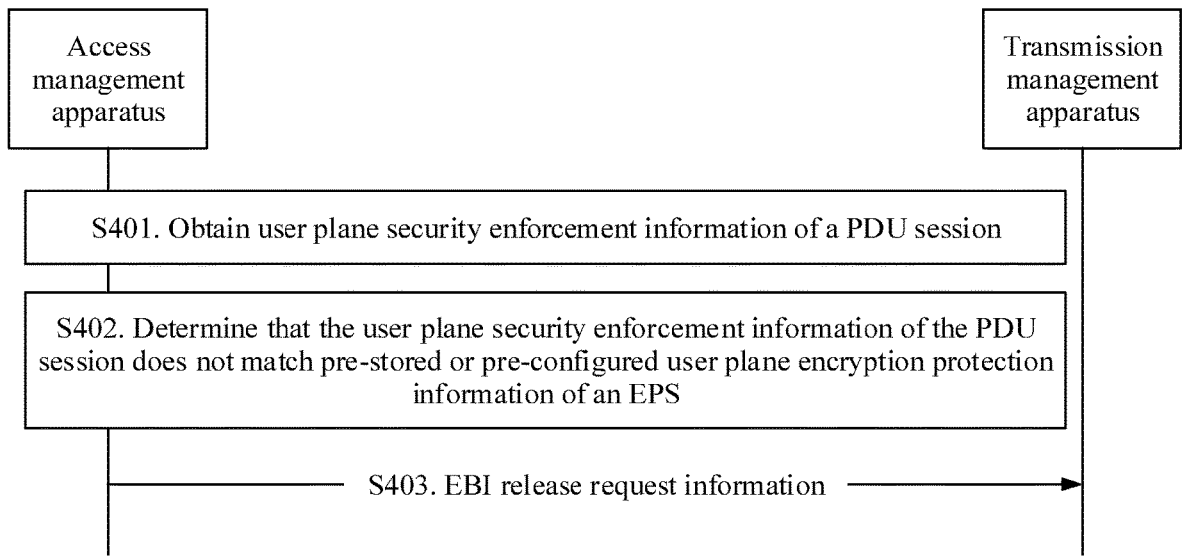
FIG. 4 is another schematic flowchart of a method for assigning an EBI according to an embodiment of the present disclosure.

FIG. 4 is a schematic flowchart of an EBI release method according to an embodiment of the present disclosure. In this embodiment of the present disclosure, the method includes the following steps.

S401. An access management apparatus obtains user plane security enforcement information of a PDU session and user plane encryption protection information of an EPS.

For example, the access management apparatus is configured to perform access and mobility management of UE in a 5GS, and the access management apparatus may be an AMF. Before S401, the access management apparatus has assigned, based on the method for assigning an EBI in FIG. 1E and FIG. 1F, an EBI to an EPS bearer to which a QoS flow is mapped in the EPS, and then the access management apparatus obtains the user plane security enforcement information of the PDU session, and obtains the user plane encryption protection information of the EPS. The access management apparatus may be an AMF in the 5GS.

In a possible implementation, that the access management apparatus obtains the user plane security enforcement information of the PDU session includes: The access management apparatus pre-stores or pre-configures a mapping relationship between a PDU session identifier and the user plane security enforcement information, and the access management apparatus determines corresponding user plane security enforcement information based on the PDU session identifier in an EBI assignment request; or the access management apparatus obtains, from a PCF, the user plane security enforcement information corresponding to a PDU session identifier.

In a possible implementation, that the access management apparatus obtains the user plane encryption protection information of the EPS includes: The access management apparatus pre-stores or pre-configures the user plane encryption protection information of the EPS; or the access management apparatus receives the user plane encryption protection information of the EPS that is sent by an MME.

S402. The access management apparatus determines that the user plane security enforcement information of the PDU session does not match user plane encryption protection information of the EPS.

For example, the access management apparatus determines whether the user plane security enforcement information of the PDU session matches the user plane encryption protection information of the EPS. Essentially, the access management apparatus determines whether a user plane security capability of the EPS can meet a user plane security requirement of the PDU session. If the user plane security enforcement information of the PDU session matches the user plane encryption protection information of the EPS, it indicates that the user plane security capability of the EPS meets the user plane security requirement of the PDU session. If the user plane security enforcement information of the PDU session does not match the user plane encryption protection information of the EPS, it indicates that the user plane security capability of the EPS does not meet the user plane security requirement of the PDU session.

In a possible implementation, the user plane security enforcement information of the PDU session includes integrity protection requirement information and encryption requirement information, and the user plane encryption protection information of the EPS includes user plane encryption activation information.

When the user plane security requirement information of the PDU session indicates that the PDU session is not integrity protected, and the user plane encryption protection information of the EPS indicates that user plane encryption of the EPS is activated, the user plane security enforcement information of the PDU session matches the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. When the transmission management apparatus determines that the integrity protection requirement information is not needed and the encryption requirement information is not needed, the transmission management apparatus does not need to parse the user plane encryption protection information. In other words, regardless of whether the user plane encryption activation information is activated or unactivated, the transmission management apparatus may directly determine that the user plane security enforcement information of the PDU session matches the user plane encryption protection information of the EPS.

In another possible implementation, when the integrity protection requirement information indicates that the PDU session is not integrity protected, the encryption requirement information indicates that the PDU session is encrypted, and the user plane encryption activation information indicates that user plane encryption of the EPS is activated, the user plane security enforcement information of the PDU session matches the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. When the transmission management apparatus determines that the integrity protection requirement information is not needed, the encryption requirement information is required, and the user plane encryption activation information is activated, the transmission management apparatus determines that the user plane security enforcement information of the PDU session matches the user plane encryption protection information of the EPS.

In another possible implementation, the user plane security enforcement information of the PDU session includes integrity protection requirement information.

When the integrity requirement information indicates that the PDU session is integrity protected, the user plane security enforcement information of the PDU session does not match the user plane encryption protection information of the EPS.

For example, the integrity protection requirement information includes three forms: required, preferred, and not needed. Required indicates that integrity protection needs to be performed on the PDU session; preferred indicates that the PDU session is preferentially integrity protected; and not needed indicates that integrity protection does not need to be performed on the PDU session. The integrity protection requirement information may be indicated using a bit, where different bit values correspond to different integrity protection requirement information. The encryption protection requirement information includes three forms: required, preferred, and not needed. Required indicates that the PDU session needs to be encrypted; preferred indicates that the PDU session is preferentially encrypted; and not needed indicates that the PDU session does not need to be encrypted. The encryption requirement information may be indicated using a bit, where different bit values are used to indicate different encryption requirement information. The user plane encryption activation information includes two forms: activated and unactivated. Because integrity protection is not supported on the user plane of the EPS, when the integrity protection requirement information is required, the transmission management apparatus does not need to parse the encryption protection requirement information and the user plane encryption activation information. In other words, the transmission management apparatus can directly determine that the user plane security enforcement information of the PDU session does not match the user plane encryption protection information of the EPS.

S403. The access management apparatus sends EBI release request information to the transmission management apparatus, and the transmission management apparatus receives the EBI release request information from the access management apparatus.

For example, the transmission management apparatus is configured to manage a PDU session in the 5GS, and manage a PDN connection in the EPS, including being responsible for establishment, modification, and deletion of the PDU session, and establishment, modification, and deletion of the PDN connection. The transmission management apparatus may include an SMF and a PGW-C, or may be an apparatus that has functions of an SMF and a PGW-C. When the user plane encryption enforcement information of the PDU session does not match the user plane encryption protection information of the EPS, the access management apparatus determines that the EBI previously assigned to the EPS bearer needs to be released, and the access management apparatus sends the EBI release request information to the transmission management apparatus corresponding to the ESP bearer, where the EBI release request information carries the EBI that needs to be released and a release cause value, and where the release cause value indicates that the user plane security requirement of the PDU session is not met.

During implementation of this embodiment of the present disclosure, when the access management apparatus has assigned the EBI to the EPS to which the QoS flow is mapped in the EPS, the access management apparatus determines whether the user plane security enforcement information of the PDU session matches the user plane encryption protection information of the EPS. When the user plane security enforcement information of the PDU session does not match the user plane encryption protection information of the EPS, the EBI previously assigned to the EPS is released, to prevent the EPS bearer from using an EBI that does not meet a user plane security requirement when UE moves from the 5GS to the EPS.

The methods in the embodiments of the present disclosure are described above in detail, and apparatuses in the embodiments of the present disclosure are provided below.

Figure 5:
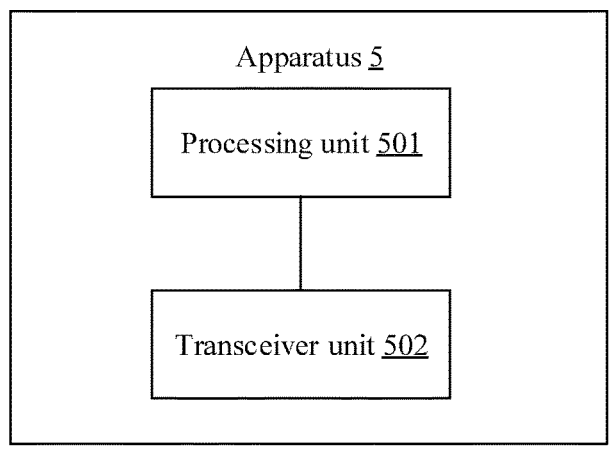
FIG. 5 is a schematic structural diagram of an apparatus according to an embodiment of the present disclosure.

FIG. 5 is a schematic structural diagram of an apparatus according to an embodiment of the present disclosure. The apparatus 5 may include a processing unit 501 and a transceiver unit 502.

Embodiment 1: The processing unit 501 is configured to determine whether user plane security enforcement information of a PDU session matches user plane encryption protection information of an EPS. For example, the processing unit 501 is configured to perform S201 in FIG. 2.

The transceiver unit 502 is configured to: when a result determined by the processing unit is yes, send EBI assignment request information to an access management apparatus, where the EBI assignment request information is used to request to assign an EBI to an EPS bearer to which a QoS flow is mapped in the EPS, and where the PDU session includes at least one QoS flow. For example, the transceiver unit 502 is configured to perform S202 in FIG. 2.

In a possible implementation, the user plane security enforcement information of the PDU session includes integrity protection requirement information and encryption requirement information, and the user plane encryption protection information of the EPS includes user plane encryption activation information, where the integrity protection requirement information indicates that the PDU session is not integrity protected, the encryption requirement information indicates that the PDU session is not encrypted, and the user plane security enforcement information of the PDU session matches the user plane encryption protection information of the EPS. Alternatively, the integrity protection requirement information indicates that the PDU session is not integrity protected, the encryption requirement information indicates that the PDU session is encrypted, the user plane encryption activation information indicates that user plane encryption of the EPS is activated, and the user plane security enforcement information of the PDU session matches the user plane encryption protection information of the EPS.

In a possible implementation, the user plane security enforcement information of the PDU session includes integrity protection requirement information and encryption requirement information, and the user plane encryption protection information of the EPS includes user plane encryption activation information. The integrity protection requirement information indicates that integrity protection is performed, and the user plane security enforcement information of the PDU session does not match the user plane encryption protection information of the EPS.

In a possible implementation, the processing unit 501 is further configured to: when the user plane security enforcement information of the PDU session does not match the user plane encryption protection information of the EPS, skip sending, by the transmission management apparatus, an EBI assignment request to the access management apparatus.

The apparatus 5 may be a transmission management apparatus. For example, the transmission management apparatus includes an SMF and a PGW-C, or may be an apparatus having functions of an SMF and a PGW-C. Alternatively, the apparatus 5 may be a field-programmable gate array (FPGA), an application-specific integrated chip (ASIC), a system on chip (SoC), a central processing unit (CPU), a network processor (NP), a digital signal processing circuit, or a micro controller unit (MCU) that implements a related function, or may be a programmable controller (PLD) or another integrated chip.

This embodiment of the present disclosure and the method embodiment in FIG. 2 are based on a same concept, and technical effects brought by this embodiment of the present disclosure and the method embodiment in FIG. 2 are also the same. For a process, refer to the descriptions in the method embodiment in FIG. 2. Details are not described herein again.

Embodiment 2: The transceiver unit 502 is configured to receive EBI assignment request information from a transmission management apparatus, where the EBI assignment request is used to request to assign an EBI to an EPS bearer to which a QoS flow is mapped in an EPS. For example, the transceiver unit 502 is configured to perform S301 in FIG. 3.

The processing unit 501 is configured to determine whether user plane security enforcement information of a PDU session in which the QoS flow is located matches user plane encryption protection information of the EPS. For example, the processing unit 501 is configured to perform S302 in FIG. 3.

The transceiver unit 502 is further configured to: when a result determined by the processing unit is yes, send EBI assignment response information to the transmission management apparatus, where the EBI assignment response information carries the EBI assigned by the apparatus 5 to the EPS bearer. For example, the transceiver unit 502 is configured to perform S303 in FIG. 3.

In a possible implementation, the user plane security enforcement information of the PDU session includes integrity protection requirement information and encryption requirement information, and the user plane encryption protection information of the EPS includes user plane encryption activation information. The integrity protection requirement information indicates that integrity protection is not performed, the encryption requirement information indicates that encryption is not performed, and the user plane security enforcement information of the PDU session matches the user plane encryption protection information of the EPS. Alternatively, the integrity protection requirement information indicates that integrity protection is not performed, the encryption requirement information indicates that encryption is performed, the user plane encryption capability information indicates that user plane encryption is supported, and the user plane security enforcement information of the PDU session matches the user plane encryption protection information of the EPS.

In a possible implementation, the user plane security enforcement information of the PDU session includes integrity protection requirement information and encryption requirement information, and the user plane encryption protection information of the EPS includes user plane encryption activation information. The integrity protection requirement information indicates that the PDU session is integrity protected, and the user plane security enforcement information of the PDU session does not match the user plane encryption protection information of the EPS.

In a possible implementation, the transceiver unit 502 is further configured to: when a result determined by the processing unit 501 is no, send the EBI assignment response information to the transmission management apparatus, where the EBI assignment response information carries cause information about an EBI assignment failure.

In a possible implementation, the transceiver unit 502 is further configured to receive, in a PDU session establishment procedure or a PDU session modification procedure, the PDU session identifier and user plane security enforcement information corresponding to the PDU session identifier from the transmission management apparatus.

The apparatus 5 may be an access management apparatus. For example, the access management apparatus may be an AMF in a 5GS. Alternatively, the apparatus 5 may be a field-programmable gate array (FPGA), an application-specific integrated chip, a system on chip (SoC), a central processing unit (CPU), a network processor (NP), a digital signal processing circuit, or a micro controller unit (MCU) that implements a related function, or may be a programmable controller (PLD) or another integrated chip.

This embodiment of the present disclosure and the method embodiment in FIG. 3 are based on a same concept, and technical effects brought by this embodiment of the present disclosure and the method embodiment in FIG. 3 are also the same. For a process, refer to the descriptions in the method embodiment in FIG. 3. Details are not described herein again.

Embodiment 3: The processing unit 501 is configured to obtain user plane security enforcement information of a PDU session, where the PDU session includes at least one QoS flow, the QoS flow is associated with an EPS bearer, and where an EBI has been assigned to the EPS bearer. For example, the processing unit 501 is configured to perform S401 in FIG. 4.

The processing unit 501 is further configured to determine whether the user plane security enforcement information of the PDU session matches pre-stored or pre-configured user plane encryption protection information of the EPS. For example, the processing unit 501 is configured to perform S402 in FIG. 4.

The transceiver unit 502 is configured to: when a result determined by the processing unit is no, send an EBI release request to a transmission management apparatus that serves the EPS bearer, where the EBI release request is used to indicate that the EBI of the EPS bearer needs to be released. For example, the transceiver unit 502 is configured to perform S403 in FIG. 4.

In a possible implementation, the user plane security enforcement information of the PDU session includes integrity protection requirement information and encryption requirement information, and the user plane encryption protection information of the EPS includes user plane encryption capability information. The integrity protection requirement information indicates that integrity protection is performed, and that the user plane security enforcement information of the PDU session does not match the user plane encryption protection information of the EPS.

In a possible implementation, the user plane security enforcement information of the PDU session includes integrity protection requirement information and encryption requirement information, and the user plane encryption protection information of the EPS includes user plane encryption activation information. The integrity protection requirement information indicates that the PDU session is not integrity protected, the encryption requirement information indicates that the PDU session is not encrypted, and the user plane security enforcement information of the PDU session matches the user plane encryption protection information of the EPS. Alternatively, the integrity protection requirement information indicates that integrity protection is not performed, the encryption requirement information indicates that the PDU session is encrypted, the user plane encryption capability information indicates that user plane encryption is supported, and the user plane security enforcement information of the PDU session matches the user plane encryption protection information of the EPS.

In a possible implementation, the processing unit 501 is further configured to: when the user plane security enforcement information of the PDU session matches the user plane encryption protection information of the EPS, skip releasing the EBI of the EPS bearer.

In a possible implementation, the transceiver unit 502 is further configured to receive, in a PDU session establishment procedure or a PDU session modification procedure, the PDU session identifier and user plane security enforcement information corresponding to the PDU session identifier from the transmission management apparatus.

In a possible implementation, the user plane encryption protection information of the EPS is from a mobility management entity MME, and the MME is an MME to which the PDU session is to be migrated.

The apparatus 5 may be an access management apparatus. For example, the access management apparatus may be an AMF in a 5GS. Alternatively, the apparatus 5 may be a field-programmable gate array (FPGA), an application-specific integrated chip, a system on chip (SoC), a central processing unit (CPU), a network processor (NP), a digital signal processing circuit, or a micro controller unit (MCU) that implements a related function, or may be a programmable controller (PLD) or another integrated chip.

This embodiment of the present disclosure and the method embodiment in FIG. 4 are based on a same concept, and technical effects brought by this embodiment of the present disclosure and the method embodiment in FIG. 4 are also the same. For a process, refer to the descriptions in the method embodiment in FIG. 4. Details are not described herein again.

Figure 6:
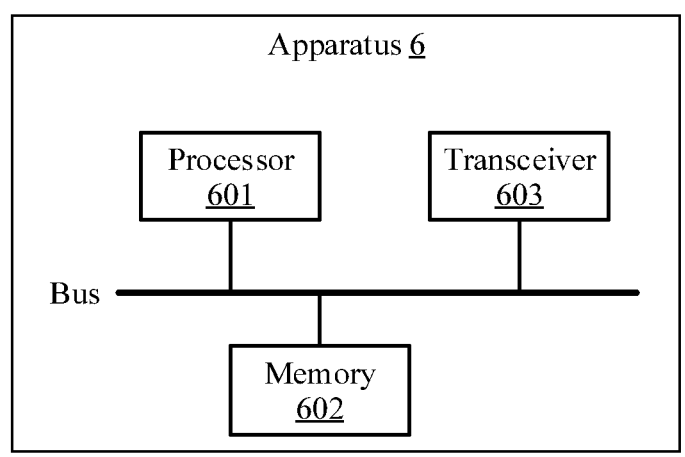
FIG. 6 is another schematic structural diagram of an apparatus according to an embodiment of the present disclosure.

FIG. 6 is a schematic structural diagram of an apparatus according to an embodiment of the present disclosure. The apparatus is referred to as an apparatus 6 below. The apparatus 6 may be integrated into the foregoing transmission management apparatus or access management apparatus. As shown in FIG. 6, the apparatus includes a memory 602, a processor 601, and a transceiver 603.

The memory 602 may be an independent physical unit, and may be connected to the processor 601 and the transceiver 603 through a bus. The memory 602, the processor 601, and the transceiver 603 may alternatively be integrated together, and implemented using hardware, or the like.

The memory 602 is configured to store a program for implementing the foregoing method embodiments or the modules in the apparatus embodiments. The processor 601 invokes the program to perform an operation in the foregoing method embodiments.

Optionally, when some or all of the methods for assigning an EBI in the foregoing embodiments are implemented using software, the apparatus 6 may alternatively include only the processor. The memory configured to store the program is located outside the apparatus 6. The processor 601 is connected to the memory using a circuit/wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The memory may include a volatile memory, for example, a random-access memory (RAM). The memory may also include a non-volatile memory, for example, a flash memory, a hard disk (HDD), or a solid-state drive (SSD). The memory may further include a combination of the foregoing types of memories.

In the foregoing embodiments, a sending module or a transmitter performs a sending step in the foregoing method embodiments, a receiving module or a receiver performs a receiving step in the foregoing method embodiments, and another step is performed by another module or a processor. The sending module and the receiving module may form a transceiver module, and the receiver and the transmitter may form a transceiver.

An embodiment of this application further provides a computer storage medium storing a computer program, and the computer program is used to perform the method for assigning an EBI provided in the foregoing embodiment.

An embodiment of this application further provides a computer program product including an instruction. When the computer program product runs on a computer, the computer is enabled to perform the method for assigning an EBI provided in the foregoing embodiment.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, such that the instructions executed by the computer or the processor of the other programmable data processing device generate an apparatus for implementing a specific function in one or more processes in the flowcharts and/or in one or more blocks in the block diagrams.

The computer program instructions may be stored in a computer-readable memory that can instruct the computer or the other programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

The computer program instructions may be loaded onto the computer or the other programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

What is claimed is:

1. A method, comprising:
    refraining, by a transmission management apparatus, from sending first evolved packet system (EPS) bearer identity (EBI) assignment request information to an access management apparatus when first integrity protection requirement information of a first protocol data unit (PDU) session indicates that integrity protection is required for the first PDU session,
    wherein the first EBI assignment request information requests assigning an EBI to an EPS bearer to which a quality of service (QoS) flow is mapped in an EPS, and
    wherein the first PDU session comprises at least one QoS flow.

2. The method of claim 1, wherein first user plane security enforcement information of the first PDU session does not match user plane encryption protection information of the EPS when the first integrity protection requirement information of the first PDU session indicates that the integrity protection is required for the first PDU session, and wherein the first user plane security enforcement information of the first PDU session comprises the first integrity protection requirement information of the first PDU session.

3. The method of claim 2, further comprising sending, by the transmission management apparatus, second EBI assignment request information to the access management apparatus when second user plane security enforcement information of a second PDU session matches the user plane encryption protection information of the EPS.

4. The method of claim 3, wherein the second user plane security enforcement information of the second PDU session comprises second integrity protection requirement information and encryption requirement information, and wherein the user plane encryption protection information of the EPS comprises user plane encryption activation information.

5. The method of claim 3, further comprising receiving, by the access management apparatus, the second EBI assignment request information from the transmission management apparatus.

6. A communications system, comprising:
    an access management apparatus; and
    a transmission management apparatus configured to refrain from sending first evolved packet system (EPS) bearer identity (EBI) assignment request information to the access management apparatus when first integrity protection requirement information of a first protocol data unit (PDU) session indicates that integrity protection is required for the first PDU session,
    wherein the first EBI assignment request information requests assigning an EBI to an EPS bearer to which a quality of service (QoS) flow is mapped in an EPS, and
    wherein the first PDU session comprises at least one QoS flow.

7. The communications system of according to claim 6, wherein first user plane security enforcement information of the first PDU session does not match user plane encryption protection information of the EPS when the first integrity protection requirement information of the first PDU session indicates that the integrity protection is required for the first PDU session, and wherein the first user plane security enforcement information of the first PDU session comprises the first integrity protection requirement information of the first PDU session.

8. The communications system of claim 7, wherein the transmission management apparatus is further configured to send second EBI assignment request information to the access management apparatus when second user plane security enforcement information of a second PDU session matches the user plane encryption protection information of the EPS.

9. The communications system of claim 8, wherein the second user plane security enforcement information of the second PDU session comprises second integrity protection requirement information and encryption requirement information, and wherein the user plane encryption protection information of the EPS comprises user plane encryption activation information.

10. The communications system of claim 8, wherein the access management apparatus is configured to receive the second EBI assignment request information from the transmission management apparatus.

11. An apparatus, comprising:
    one or more processors; and
    a memory coupled to the one or more processors and configured to store instructions that, when executed by the one or more processors, cause the apparatus to refrain from sending first evolved packet system (EPS) bearer identity (EBI) assignment request information to an access management apparatus when first integrity protection requirement information of a first protocol data unit (PDU) session indicates that integrity protection is required for the first PDU session,
    wherein the first EBI assignment request information requests assigning an EBI to an EPS bearer to which a quality of service (QoS) flow is mapped in an EPS, and wherein the first PDU session comprises at least one QoS flow.

12. The apparatus of claim 11, wherein first user plane security enforcement information of the first PDU session does not match user plane encryption protection information of the EPS when the first integrity protection requirement information of the first PDU session indicates the integrity protection is required for the first PDU session, and wherein the first user plane security enforcement information of the first PDU session comprises the first integrity protection requirement information of the first PDU session.

13. The apparatus of claim 12, wherein the instructions further cause the apparatus to send second EBI assignment request information to the access management apparatus when second user plane security enforcement information of a second PDU session matches the user plane encryption protection information of the EPS.

14. The apparatus of claim 13, wherein the second user plane security enforcement information of the second PDU session comprises second integrity protection requirement information and encryption requirement information, wherein the user plane encryption protection information of the EPS comprises user plane encryption activation information, wherein the encryption requirement information indicates that the second PDU session is not encrypted when the second integrity protection requirement information indicates that the second PDU session is not integrity protected, and wherein the second user plane security enforcement information of the second PDU session matches the user plane encryption protection information of the EPS when the second integrity protection requirement information indicates that the second PDU session is not integrity protected.

15. The apparatus of claim 13, wherein the second user plane security enforcement information of the second PDU session comprises second integrity protection requirement information and encryption requirement information, wherein the user plane encryption protection information of the EPS comprises user plane encryption activation information, and wherein when the second integrity protection requirement information indicates that the second PDU session is not integrity protected:
the encryption requirement information indicates that the second PDU session is encrypted;
the user plane encryption activation information indicates that user plane encryption of the EPS is activated; and
the second user plane security enforcement information of the second PDU session matches the user plane encryption protection information of the EPS.

16. The method of claim 4, wherein the encryption requirement information indicates that the second PDU session is not encrypted when the second integrity protection requirement information indicates that the second PDU session is not integrity protected.

17. The method of claim 16, wherein the second user plane security enforcement information of the second PDU session matches the user plane encryption protection information of the EPS when the second integrity protection requirement information indicates that the second PDU session is not integrity protected.

18. The method of claim 17, wherein the user plane encryption activation information indicates that user plane encryption of the EPS is activated when the second integrity protection requirement information indicates that the second PDU session is not integrity protected.

19. The communications system of claim 9, wherein the encryption requirement information indicates that the first PDU session is not encrypted when the second integrity protection requirement information indicates that the second PDU session is not integrity protected.

20. The communications system claim 19, wherein the second user plane security enforcement information of the second PDU session matches the user plane encryption protection information of the EPS when the second integrity protection requirement information indicates that the second PDU session is not integrity protected, and wherein the user plane encryption activation information indicates that user plane encryption of the EPS is activated when the second integrity protection requirement information indicates that the second PDU session is not integrity protected.

* * * * *

UNITED STATES PATENT AND TRADEMARK OFFICE
CERTIFICATE OF CORRECTION

PATENT NO. : 11,849,313 B2
APPLICATION NO. : 17/174581
DATED : December 19, 2023
INVENTOR(S) : Haiyang Sun, Anni Wei and Chunshan Xiong It is certified that error appears in the above-identified patent and that said Letters Patent is hereby corrected as shown below:

On the Title Page

(57) Abstract should read: "A method and an apparatus for assigning an evolved packet system (EPS) bearer identity (EBI), where the method includes determining, when an EBI needs to be assigned to an EPS bearer to which a quality of service (QoS) flow is mapped in an EPS, whether user plane security enforcement information of a protocol data unit (PDU) session matches user plane encryption protection information of the EPS, that is, whether a user plane capability of the EPS can meet a user plane security requirement of the PDU session is determined. The EBI is assigned to the EPS bearer only when the requirement is met. Otherwise, the EBI is not assigned to the EPS bearer or the EBI is released if the EBI has been assigned. In this way, when a user equipment (UE) moves from a 5th generation (5G) system (5GS) to the EPS, the EPS bearer is prevented from using an EBI that does not meet the user plane security requirement for data transmission."

Signed and Sealed this
Nineteenth Day of March, 2024

Katherine Kelly Vidal
*Director of the United States Patent and Trademark Office*